(12) United States Patent
Nakao

(10) Patent No.: US 11,276,427 B2
(45) Date of Patent: Mar. 15, 2022

(54) MAGNETIC TAPE RECORDING AND REPRODUCING APPARATUS AND RECORDING AND REPRODUCING METHOD

(71) Applicant: FUJIFILM CORPORATION, Tokyo (JP)

(72) Inventor: Toru Nakao, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 65 days.

(21) Appl. No.: 17/006,917

(22) Filed: Aug. 31, 2020

(65) Prior Publication Data

US 2021/0065741 A1 Mar. 4, 2021

(30) Foreign Application Priority Data

Sep. 4, 2019 (JP) .............................. JP2019-161488

(51) Int. Cl.
| | | |
|---|---|---|
| G11B 5/265 | (2006.01) | |
| G11B 5/55 | (2006.01) | |
| G11B 5/584 | (2006.01) | |
| G11B 5/008 | (2006.01) | |
| G11B 5/592 | (2006.01) | |
| G11B 5/48 | (2006.01) | |

(52) U.S. Cl.
CPC ........ *G11B 5/5928* (2013.01); *G11B 5/00817* (2013.01); *G11B 5/265* (2013.01); *G11B 5/4893* (2013.01); *G11B 5/5504* (2013.01); *G11B 5/5508* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 8,824,083 B1* | 9/2014 | Kientz | G11B 5/584 |
| | | | 360/55 |
| 9,305,580 B2* | 4/2016 | Cherubini | G11B 5/584 |

(Continued)

FOREIGN PATENT DOCUMENTS

| | | | |
|---|---|---|---|
| JP | 2003-168269 A | 6/2003 | |
| JP | 2004-318983 A | 11/2004 | |

(Continued)

*Primary Examiner* — Jefferson A Evans
(74) *Attorney, Agent, or Firm* — Solaris Intellectual Property Group, PLLC

(57) ABSTRACT

A recording and reproducing apparatus includes: a magnetic head in which a servo band having a servo pattern and a data band having data tracks are alternately arranged along a width direction, the magnetic head including a recording and reproducing element that records or reproduces data with respect to the data track, and at least two servo reproducing elements that read servo patterns adjacent to each other in the width direction of the magnetic tape; a selection unit that selects a servo reproducing element from the servo reproducing elements according to a position of the data track, as a target of recording or reproducing of data in the data band, along the width direction; and a controller that controls positioning of the magnetic head along the width direction by using a result of reading of the servo patterns by the servo reproducing element selected by the selection unit.

9 Claims, 25 Drawing Sheets

(56) References Cited

U.S. PATENT DOCUMENTS

| | | | | |
|---|---|---|---|---|
| 10,832,713 B2* | 11/2020 | Biskeborn | ............ | G11B 27/107 |
| 2006/0092547 A1* | 5/2006 | Kawakami | ............ | G11B 5/584 |
| | | | | 360/71 |
| 2014/0334033 A1* | 11/2014 | Biskeborn | .......... | G11B 5/00826 |
| | | | | 360/76 |
| 2015/0092294 A1* | 4/2015 | Cherubini | .......... | G11B 5/00817 |
| | | | | 360/63 |
| 2016/0179417 A1* | 6/2016 | Fasen | .................... | G06F 3/0619 |
| | | | | 360/75 |
| 2019/0348067 A1* | 11/2019 | Goker | ................ | G11B 5/00813 |
| 2020/0312366 A1* | 10/2020 | Kagawa | ................ | G11B 15/07 |

FOREIGN PATENT DOCUMENTS

| | | |
|---|---|---|
| JP | 2005-327392 A | 11/2005 |
| JP | 2010-231843 A | 10/2010 |
| JP | 2012-053940 A | 3/2012 |

* cited by examiner

| SERVO BAND | SERVO POSITION NUMBER | DISTANCE D [μm] |
|---|---|---|
| 0 | 0 | 21.389 |
|   | 1 | 22.613 |
|   | 2 | 23.837 |
|   | 3 | 25.062 |
|   | 4 | 26.286 |
|   | ... | ... |
| 1 | ... | ... |
| ... | ... | ... |

| DATA BAND | LAPPING POSITION | INTERVAL K3 [μm] |
|---|---|---|
| 0 | 0 | 2858.7 |
|   | 1 | 2858.7 |
|   | 2 | 2858.7 |
|   | ... | ... |
| 1 | ... | ... |
| ... | ... | ... |

FIG. 29

| DATA BAND | LAPPING POSITION | INTERVAL K3 [μm] | INTERVAL S1r [μm] | INTERVAL K1 [μm] | TENSION [N] |
|---|---|---|---|---|---|
| 0 | 0 | 2858.7 | 2858.8 | 2858.92 | 0.60 |
|   | 1 | 2858.7 | 2858.8 | 2858.95 | 0.62 |
|   | 2 | 2858.7 | 2858.8 | 2858.87 | 0.58 |
|   | ⋮ | ⋮ | ⋮ | ⋮ | ⋮ |
| 1 | ⋮ | ⋮ | ⋮ | ⋮ | ⋮ |
| ⋮ |   |   |   |   |   |

~16

IDEAL SERVO PATTERN

ACTUAL SERVO PATTERN

SP1 SP2
SP

SP1 SP2
SP

MAGNETIC TAPE RECORDING AND REPRODUCING APPARATUS AND RECORDING AND REPRODUCING METHOD

CROSS-REFERENCE TO RELATED APPLICATION

This application claims priority from Japanese Patent Application No. 2019-161488, filed Sep. 4, 2019, the disclosure of which is incorporated herein by reference in its entirety.

BACKGROUND

Technical Field

The present disclosure relates to a recording and reproducing apparatus, a recording and reproducing method, and a storage medium storing a recording and reproducing program.

Related Art

In related art, a servo pattern is written on a magnetic tape, in order to cause a recording and reproducing element of a magnetic head to follow a data track comprised in the magnetic tape.

JP2003-168269A discloses a magnetic tape in which each servo pattern is vertically asymmetrical and on which servo patterns, of which servo patterns recorded on two servo bands are vertically symmetrical, are recorded.

In addition, JP2005-327392A discloses a tape drive which records data on a magnetic tape including a plurality of servo bands in which servo patterns are written and data bands formed between the servo bands, while performing tracking based on the servo patterns. In this tape drive, recording conditions obtained by reading the servo pattern by a servo reproducing element in a case of recording data are written on at least one of data tracks of the data band by a data recording element.

However, in recent years, realization of high-density of a magnetic tape has proceeded, and accordingly, a width of a data track and intervals between the data tracks become extremely narrow. In the future, it is expected that realization of the high density of the magnetic tape further proceeds, and therefore, a higher accuracy is required for positioning of a magnetic head of the magnetic tape in the width direction.

For example, in a case where the magnetic tape is deformed in a width direction due to expansion and contraction, a positioning accuracy of a magnetic head in the width direction of the magnetic tape may decrease. However, the technology disclosed in JP2003-168269A may not be able to prevent a decrease in the positioning accuracy of the magnetic head. In addition, in the technology disclosed in JP2005-327392A, it is necessary to proceed a complicated process, because it is necessary to record the conditions for recording data and use the conditions for recording in a case of reproducing the data, in order to position the magnetic head.

SUMMARY

The disclosure has been made in view of the above circumstances, and provides a recording and reproducing apparatus, a recording and reproducing method, and a storage medium storing a recording and reproducing program capable of easily preventing a decrease in positioning accuracy of a magnetic head.

According to an aspect of the disclosure, there is provided a recording and reproducing apparatus comprising: a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track and at least two servo reproducing elements that read servo patterns adjacent to each other in the width direction of the magnetic tape, respectively; a selection unit that selects one or two servo reproducing elements from the servo reproducing elements of the magnetic head according to a position of the data track, as a target of recording or reproducing of data in the data band, along the width direction; and a controller that controls positioning of the magnetic head along the width direction by using a result of reading of the servo patterns by the servo reproducing element selected by the selection unit.

In the recording and reproducing apparatus of the disclosure, the number of the recording and reproducing elements simultaneously used during a recording or reproducing operation may be smaller than the number of the data tracks included in one data band, the number of the servo reproducing elements may be three or more according to a ratio of the number of the data tracks included in one data band to the number of the recording and reproducing elements, and the selection unit may select two servo reproducing elements according to the position.

In the recording and reproducing apparatus of the disclosure, one data band may comprise a plurality of data track groups each including the plurality of the data tracks, and the number of the recording and reproducing elements simultaneously used during the recording or reproducing operation may be smaller than the number of the data track groups included in one data band.

In the recording and reproducing apparatus of the disclosure, the number of the servo reproducing elements may be twice a ratio of the number of the data track groups included in one data band to the number of the recording and reproducing elements simultaneously used during the recording or reproducing operation.

In the recording and reproducing apparatus of the disclosure, the controller may control positioning of the magnetic head along the width direction so that a ratio between deviation amounts of the two servo reproducing elements selected by the selection unit from a target position becomes a ratio between distances from a center between the recording and reproducing elements on both ends of the magnetic head along the width direction to the two selected servo reproducing elements.

According to another aspect of the disclosure, there is provided a recording and reproducing method performed by a recording and reproducing apparatus including a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track and at least two servo reproducing elements that read servo patterns adjacent to each other in the width direction of the magnetic tape, respectively, the method comprising: selecting one or two servo reproducing elements from the servo reproducing elements of the magnetic head according to a position of the data track, as a target of recording or reproducing of data in the data band, along the width direction; and positioning the magnetic head along the width direction by using a result of reading of the servo patterns by the selected one or two servo reproducing elements.

In the recording and reproducing method of the disclosure, the number of the recording and reproducing elements simultaneously used during a recording or reproducing operation may be smaller than the number of the data tracks included in one data band, the number of the servo reproducing elements may be three or more according to a ratio of the number of the data tracks included in one data band to the number of the recording and reproducing elements, two servo reproducing elements may be selected according to the position, and the method may further include positioning the magnetic head along the width direction such that a ratio between deviation amounts of the two selected servo reproducing elements from a target position may become a ratio between distances from a center between the recording and reproducing elements on both ends of the magnetic head along the width direction to the two selected servo reproducing elements.

According to another aspect of the disclosure, there is provided a non-transitory storage medium storing a program that causes a recording and reproducing apparatus to perform recording and reproducing processing, the recording and reproducing apparatus including a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track and at least two servo reproducing elements that read servo patterns adjacent to each other in the width direction of the magnetic tape, respectively, the recording and reproducing processing including: selecting one or two servo reproducing elements from the servo reproducing elements of the magnetic head according to a position of the data track, as a target of recording or reproducing of data in the data band, along the width direction; and positioning the magnetic head along the width direction by using a result of reading of the servo patterns by the selected servo reproducing elements.

According to the disclosure, it is possible to easily prevent a decrease in accuracy of the positioning of the magnetic head.

BRIEF DESCRIPTION OF THE DRAWINGS

FIG. 29 is a view showing an example of the servo band interval information according to the fifth embodiment.

DETAILED DESCRIPTION

Figure 1:
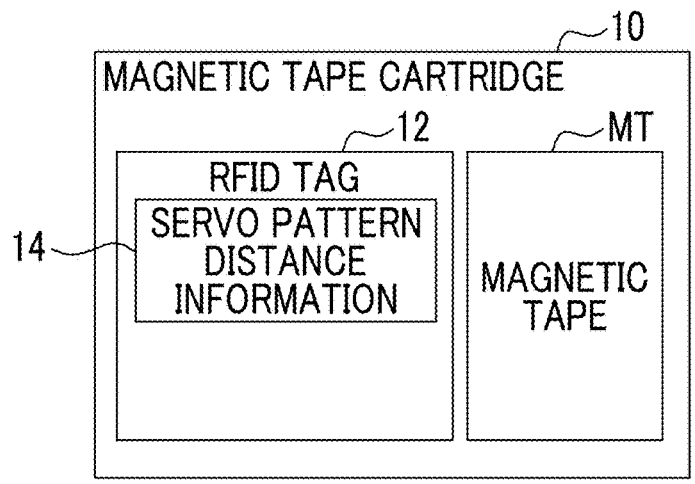
FIG. 1 is a block diagram showing an example of a configuration of a magnetic tape cartridge according to first to fourth embodiments.

Hereinafter, embodiments for implementing technologies of the disclosure will be described in detail with reference to the drawings.

First of all, before describing the details of the embodiments, servo patterns used in the following embodiments will be described.

For various steps for manufacturing a magnetic tape, paragraphs 0067 to 0070 of JP2010-231843A can be referred to. A servo pattern can be formed on the magnetic tape by a well-known method, in order to realize tracking control of a magnetic head in a magnetic tape device and control of a running speed of the magnetic tape. The "formation of the servo pattern" can be "recording of a servo signal". The servo signal is generally recorded along a longitudinal direction of the magnetic tape. As the control method using a servo signal, timing-based servo, amplitude servo, frequency servo, and the like are used. Hereinafter, the recording of the servo signal will be further described.

As shown in European Computer Manufacturers Association (ECMA)-319, a timing-based servo system is used in a magnetic tape based on a linear tape-open (LTO) standard (generally referred to as an "LTO tape"). In this timing-based servo system, the servo signal is configured by continuously disposing a plurality of pairs of magnetic stripes (also referred to as "servo stripes") not parallel to each other in the longitudinal direction of the magnetic tape. As described above, a reason for that the servo signal is configured with the pairs of magnetic stripes not parallel to each other is to inform a servo reproducing element passing on the servo signal a passage position thereof. Specifically, the one pair of the magnetic stripes are formed so that a gap thereof is continuously changed along the width direction of the magnetic tape, and a relative position of the servo signal and the servo reproducing element can be recognized, by the reading of the gap thereof by the servo reproducing element. The information of this relative position can realize the tracking of a data track. Accordingly, a plurality of servo tracks are generally set on the servo signal along the width direction of the magnetic tape.

The servo band is configured of a servo signal continuous in the longitudinal direction of the magnetic tape. A plurality of servo bands are normally provided on the magnetic tape. A region interposed between two adjacent servo bands is called a data band. The data band is configured of a plurality of data tracks and each data track corresponds to each servo track.

In one embodiment, as shown in JP2004-318983A, information showing a servo band number (also referred to as "servo band identification (ID)") is embedded in each servo band. This servo band ID is recorded by shifting a specific servo stripe among the plurality of pairs of servo stripes in the servo band so that the position thereof is relatively deviated in the longitudinal direction of the magnetic tape. Specifically, a method for deviating the specific servo stripe among the plurality of pairs of servo stripes vary for each servo band. Accordingly, the recorded servo band ID is unique for each servo band, and therefore, the servo band can be uniquely specified by only reading one servo band by the servo reproducing element.

In the method for specifying the servo band, a method using a deviation in the longitudinal direction between adjacent servo bands as shown in ECMA-319 is used. In this method, the recording is performed by deviating the entire group of a plurality of pairs of magnetic stripes not parallel to each other which are continuously disposed in the longitudinal direction of the magnetic tape in the longitudinal direction of the magnetic tape for each servo band. In a case where a combination of the deviating method between the adjacent servo bands is set to be unique in the entire magnetic tape, the servo band can also be uniquely specified in a case of reading of the adjacent servo signals by two servo reproducing elements at the same time.

In addition, as shown in ECMA-319, information showing the position in the longitudinal direction of the magnetic tape (also referred to as "LPOS information") is normally embedded in each servo band. This LPOS information is also recorded so that the position of one pair of servo stripes are deviated in the longitudinal direction of the magnetic tape, in the same manner as the servo band ID. However, unlike the servo band ID, the same signal is recorded on each servo band in this LPOS information.

Other information different from the servo band ID and the LPOS information can be embedded in the servo band. In this case, the embedded information may be different for each servo band as the servo band ID, or may be common in all of the servo bands, as the LPOS information. In addition, as a method for embedding the information in the servo band, a method other than the method described above can be used. For example, a predetermined code may be recorded by thinning out a predetermined pair among the group of pairs of the servo stripes.

A head for servo signal recording is referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of recording the servo signal, by inputting a current pulse while causing the magnetic tape to run on the servo write head, the magnetic pattern corresponding to the pair of gaps is transferred to the magnetic tape, and the servo signal can be recorded. A width of each gap can be suitably set in accordance with a density of the servo signal to be recorded. The width of each gap can be set as, for example, 1 μm or less, 1 to 10 μm, 10 μm or more.

Before recording the servo signal on the magnetic tape, a demagnetization (erasing) process is generally performed on the magnetic tape. This erasing process can be performed by applying a uniform magnetic field to the magnetic tape by using a direct current magnet or an alternating current magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. In addition, the erasing process can also be performed in an oblique direction. The erasing process may be performed with respect to the entire magnetic tape or may be performed only with respect to a region of the servo band of the magnetic tape.

A direction of the magnetic field of the servo signal to be recorded is determined in accordance with the direction of erasing. For example, in a case where the horizontal DC erasing is performed with respect to the magnetic tape, the recording of the servo signal is performed so that the direction of the magnetic field is opposite to the direction of erasing. Accordingly, the output obtained by reading the servo signal can be increased. As disclosed in JP2012-053940A, in a case where the pattern is transferred to the magnetic tape subjected to the vertical DC erasing by using the gap, the reading signal of the recorded servo signal has a unipolar pulse shape. Meanwhile, in a case where the pattern is transferred to the magnetic tape subjected to the horizontal DC erasing by using the gap, the reading signal of the recorded servo signal has a bipolar pulse shape.

As a head other than the magnetic head which performs at least one of the recording of data or the reproducing of data, a magnetic head including a servo reproducing element may be included in the magnetic tape device. For example, the magnetic head can include two servo reproducing elements, and the two servo reproducing elements can read two adjacent servo bands, respectively, at the same time. One or a plurality of elements for data can be disposed between the two servo reproducing elements.

First Embodiment

A configuration of a magnetic tape cartridge 10 according to the embodiment will be described with reference to FIGS. 1 and 2. As shown in FIG. 1, a magnetic tape cartridge 10 comprises a magnetic tape MT on which information is magnetically recorded, and a radio frequency identifier (RFID) tag 12 as an example of a second recording medium capable of recording and reading information by wireless communication or the like in a contactless manner. On the RFID tag 12, servo pattern distance information 14 and the like are recorded. Details of the servo pattern distance information 14 will be described later. An example of the magnetic tape MT is an LTO tape.

Figure 2:
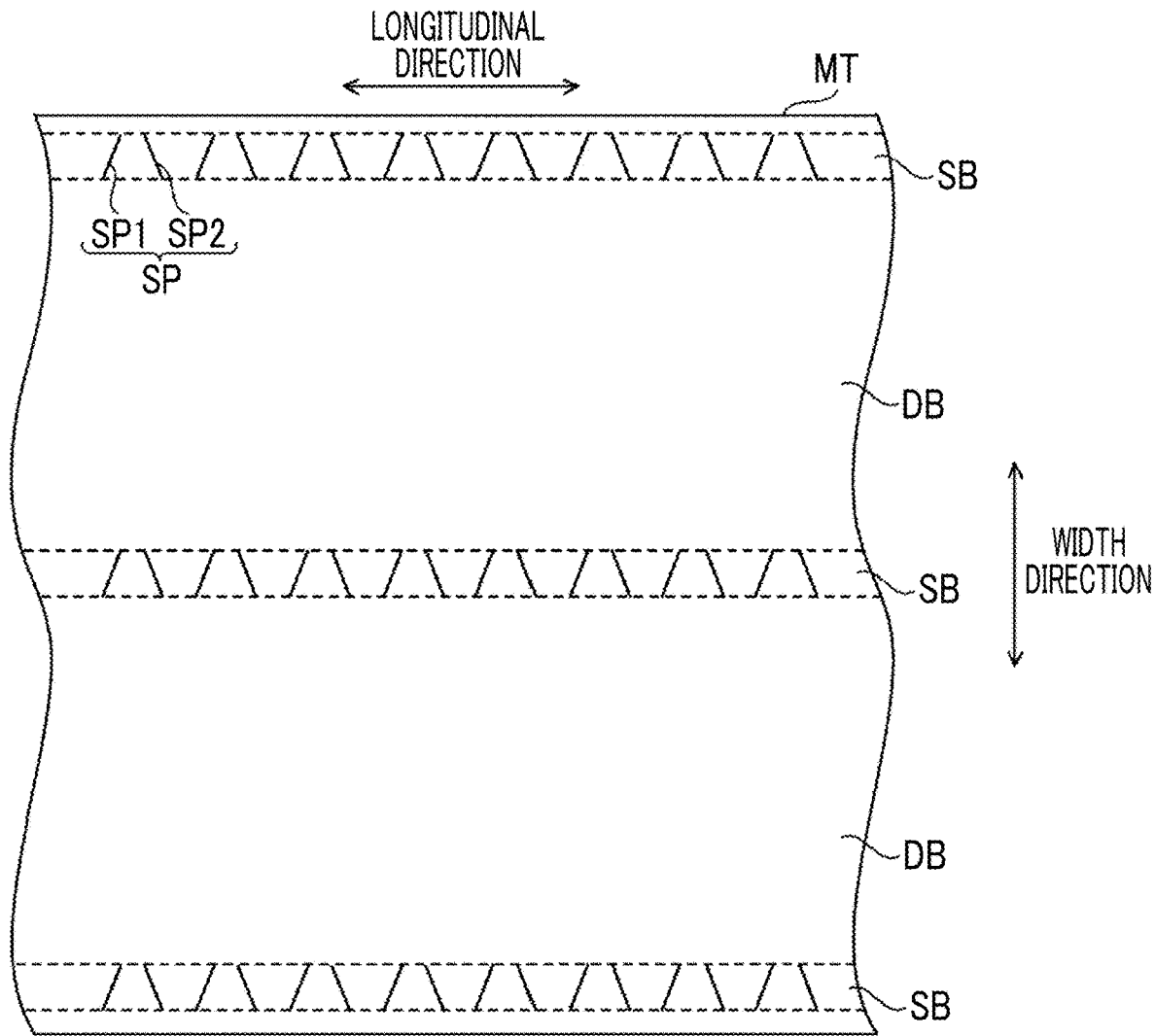
FIG. 2 is a plan view showing an example of a magnetic tape according to each embodiment.

As shown in FIG. 2, three servo bands SB are formed on the magnetic tape MT along a longitudinal direction of the magnetic tape MT. The three servo bands SB are formed so as to be arranged in a width direction (short direction) of the magnetic tape MT at regular intervals. A data band DB, on which data is recorded, is formed between each of the three servo bands SB. In other words, the servo bands SB and the data bands DB are arranged alternately along the width direction of the magnetic tape MT. The number of the servo bands SB and the data bands DB is not limited to the example shown in FIG. 2. For example, the number of servo bands SB may be 5 and the number of data bands DB may be 4. Hereinafter, the longitudinal direction of the magnetic tape MT is referred to as a "tape longitudinal direction", and the width direction of the magnetic tape MT is referred to as a "tape width direction".

On the servo band SB, servo patterns SP for performing positioning of a magnetic head H (see FIG. 3) in the tape width direction are repeatedly formed along the tape longitudinal direction. The servo pattern SP includes a linear pattern SP1 and a linear pattern SP2 which are formed along the tape width direction to be tilted with respect to the tape width direction by a predetermined angle. The linear pattern SP2 is formed not to be parallel with the linear pattern SP1. In the embodiment, the linear pattern SP2 is formed so as to be linearly symmetrical to the linear pattern SP1 with respect to the linear line along the tape width direction. FIG. 2 shows an example in which the servo pattern SP includes one pair of the linear pattern SP1 and the linear pattern SP2, but the servo pattern SP may include the plurality of linear patterns SP1 and the linear patterns SP2.

Next, a process of positioning the magnetic head H with respect to the tape width direction of the magnetic tape MT on which the servo pattern SP is formed will be described with reference to FIGS. 3 and 4.

Figure 3:
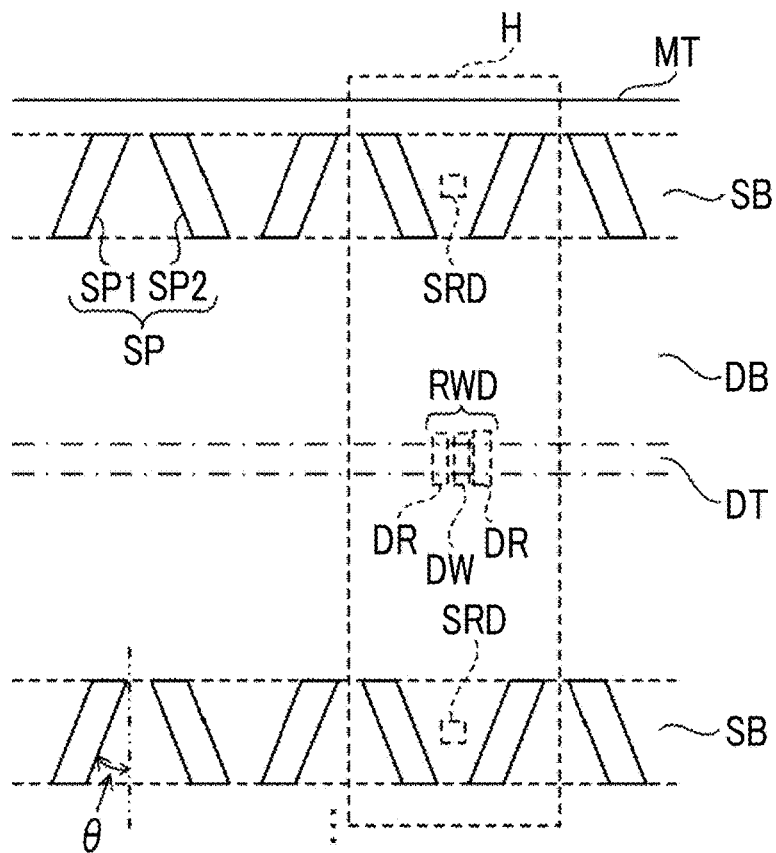
FIG. 3 is a plan view for describing a positioning process of a magnetic head according to each embodiment.

As shown in FIG. 3, the magnetic head H includes a servo reproducing element SRD which reproduces the servo pattern SP recorded on the servo band SB, and a recording and reproducing element RWD which performs recording or reproducing of data with respect to the data track DT. The recording and reproducing element RWD includes a data reproducing element DR which reproduces data and a data recording element DW which records data. In this embodiment, the recording and reproducing element RWD comprises the data reproducing element DR on both sides of the data recording element DW in the tape longitudinal direction. This is because the data reproducing element DR arranged behind the data recording element DW in a running direction of the magnetic tape MT records and verifies the data, both in a case where the magnetic tape MT is pulled out from the magnetic tape cartridge 10 and in a case where it is rewound. The reproduction here means to read a signal representing the servo pattern SP or data recorded on the magnetic tape MT. In addition, the position of the magnetic head H, the position of the servo reproducing element SRD, and the position of the recording and reproducing element RWD, which are simply noted, respectively mean positions along the tape width direction.

The magnetic head H according to the embodiment comprises two servo reproducing elements SRD that read the servo patterns SP recorded on the servo bands SB adjacent to each other in the tape width direction, respectively. The recording and reproducing element RWD is arranged along the tape width direction between the two servo reproducing elements SRD.

In the embodiment, in a case where the magnetic tape MT runs in a predetermined running direction (for example, right to left direction in FIG. 3), the servo reproducing element SRD of the magnetic head H is positioned at a predetermined position of the servo band SB in the tape width direction, thereby positioning the magnetic head H with respect to the magnetic tape MT. Hereinafter, the running direction simply written means the running direction of the magnetic tape MT.

In a case where the linear pattern SP1 and the linear pattern SP2 pass through a detection position of the servo reproducing element SRD, the servo reproducing element SRD detects the linear pattern SP1 and the linear pattern SP2. In this case, the magnetic head H is positioned at a position so that a detection interval of the linear pattern SP1 and the linear pattern SP2 becomes a predetermined value. Accordingly, the recording and reproducing element RWD of the magnetic head H follows a predetermined data track DT. For the positioning of the magnetic head H, for example, an average value of the detection intervals of the two servo reproducing elements SRD is used.

Figure 4:
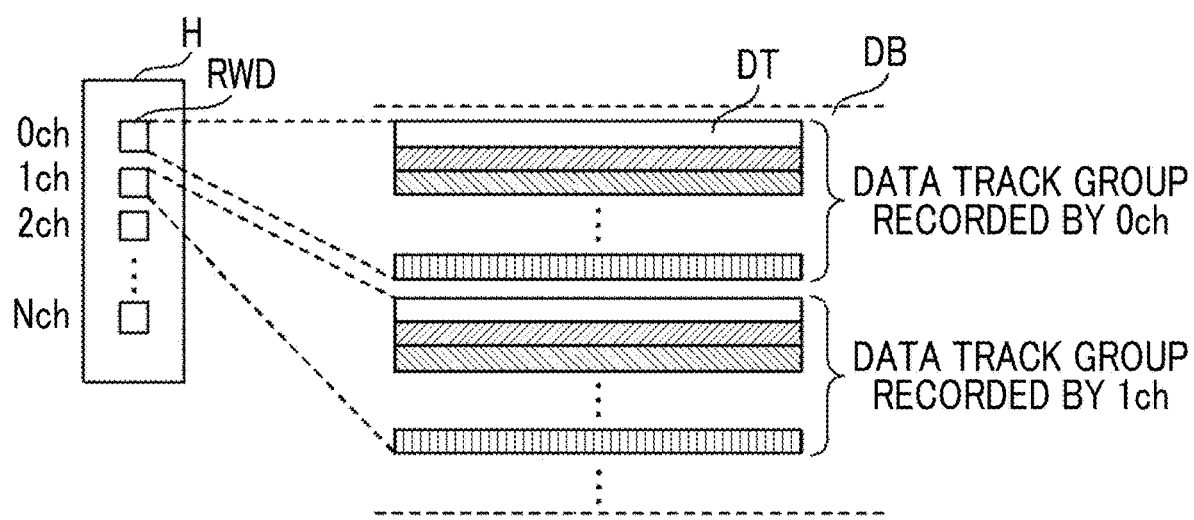
FIG. 4 is a view for describing a process of recording or reproducing of data performed by a recording and reproducing element according to each embodiment.

As shown in FIG. 4, the plurality of recording and reproducing elements RWD are arranged between the two servo reproducing elements SRD along the tape width direction and can perform recording and reproducing of data at the same time on the plurality of data tracks DT. In addition, as shown in FIG. 4, one data band DB includes a plurality of data track groups including a plurality of data tracks DT on which data is recorded by each recording and reproducing element RWD.

Next, a configuration of a servo writer SW which records the servo pattern SP on each servo band SB of the magnetic tape MT according to the embodiment will be described with reference to FIGS. 5A and 5B.

Figure 5A:
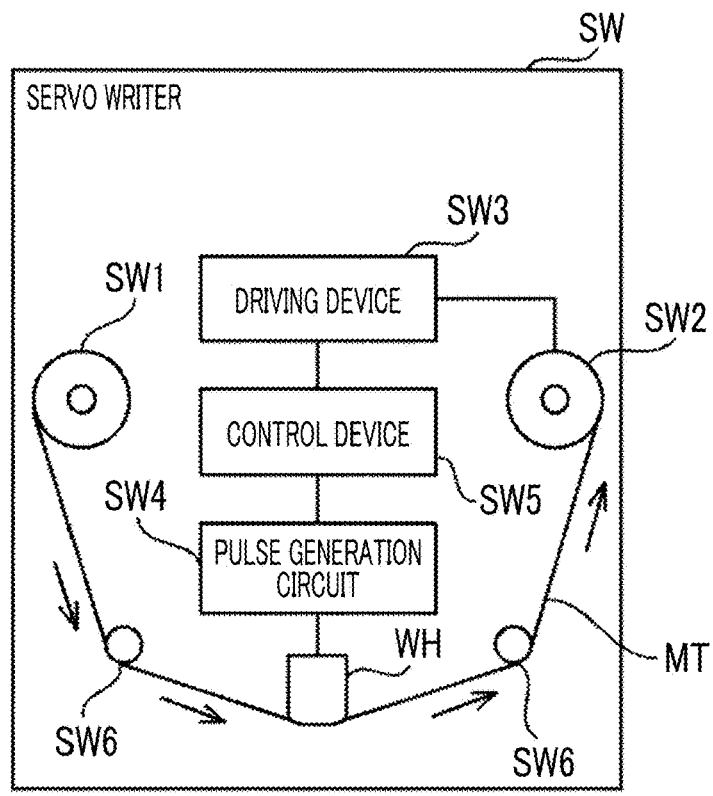
FIG. 5A is a view showing an example of a configuration of a servo writer according to each embodiment.

As shown in FIG. 5A, the servo writer SW comprises a sending reel (i.e., supply reel) SW1, a winding reel (i.e., take-up reel) SW2, a driving device SW3, a pulse generation circuit SW4, a control device SW5, and a servo signal writing head WH. In addition, the servo writer SW also comprises a power device, a cleaning device which cleans the magnetic tape MT, a verifying device which performs inspection of the servo pattern SP recorded on the magnetic tape MT, and the like which are not shown.

In the sending reel SW1, the magnetic tape MT cut to have a product width from a raw web having a wide width, before writing the servo pattern SP is set on a pancake reel having a large diameter, and the magnetic tape MT is sent at the time of writing the servo pattern SP. The magnetic tape MT sent from the sending reel SW1 is guided to a guide SW6 and the like and transported to the servo signal writing head WH. The magnetic tape MT in which the servo pattern SP is recorded on each servo band SB with the servo signal writing head WH is guided to the guide SW6 and the like and transported to the winding reel SW2. The winding reel SW2 is rotatably driven by a driving device SW3, and the magnetic tape MT on which the servo pattern SP is recorded is wound up.

The driving device SW3 is a device for rotatably driving the winding reel SW2, and comprises a motor (not shown), a motor driving circuit for supplying a current to the motor, a gear for connecting a motor axis and the winding reel SW2, and the like. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 5B) provided in the servo signal writing head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is recorded at a predetermined position of each servo band SB. The recording pulse current is a current value sufficient for magnetizing the magnetic layer of the magnetic tape MT by a leakage flux from a gap pattern G (see FIG. 5B), and is set by considering properties of the coil C of the servo signal writing head WH.

Figure 5B:
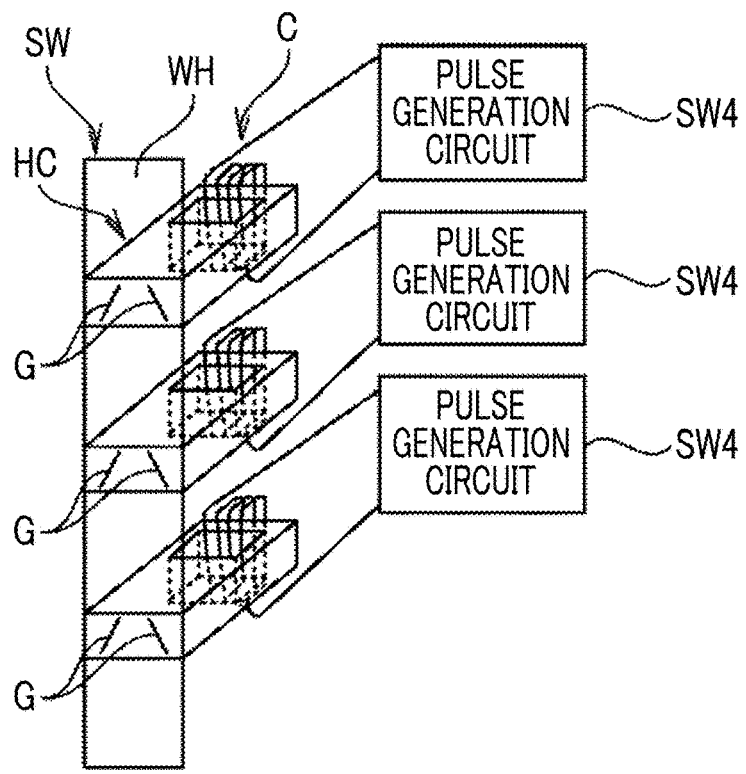
FIG. 5B is another view showing the example of the configuration of the servo writer according to each embodiment.

As shown in FIG. 5B, the servo signal writing head WH includes the linear gap pattern G provided at a position corresponding to each servo band SB, and the servo pattern SP is recorded on the servo band SB of the magnetic tape MT with each gap pattern G. One linear pattern of the gap pattern G is tilted according to the angle of the linear pattern SP1, and the other linear pattern is not parallel to the one linear pattern according to the linear pattern SP2. The gap pattern G is an example of a servo recording element which records the servo pattern SP on the servo band SB.

In addition, a head core HC is independent for each gap pattern and each coil C is wound around the head core HC. Each pulse generation circuit SW4 connected to each coil C converts the data for distinguishing each servo band SB encoded in the control device SW5 into a pattern of the recording pulse current, and the recording pulse current is supplied to the coil C according to this pattern. Accordingly, unique identification information corresponding to each servo band SB is embedded in the servo pattern SP of each servo band SB. The head core HC may not be independent for each gap pattern G and, for example, one head core HC may be provided for all of the gap patterns G. In this case, the servo pattern SP is collectively recorded on each servo band SB by one recording pulse current.

Figure 6:
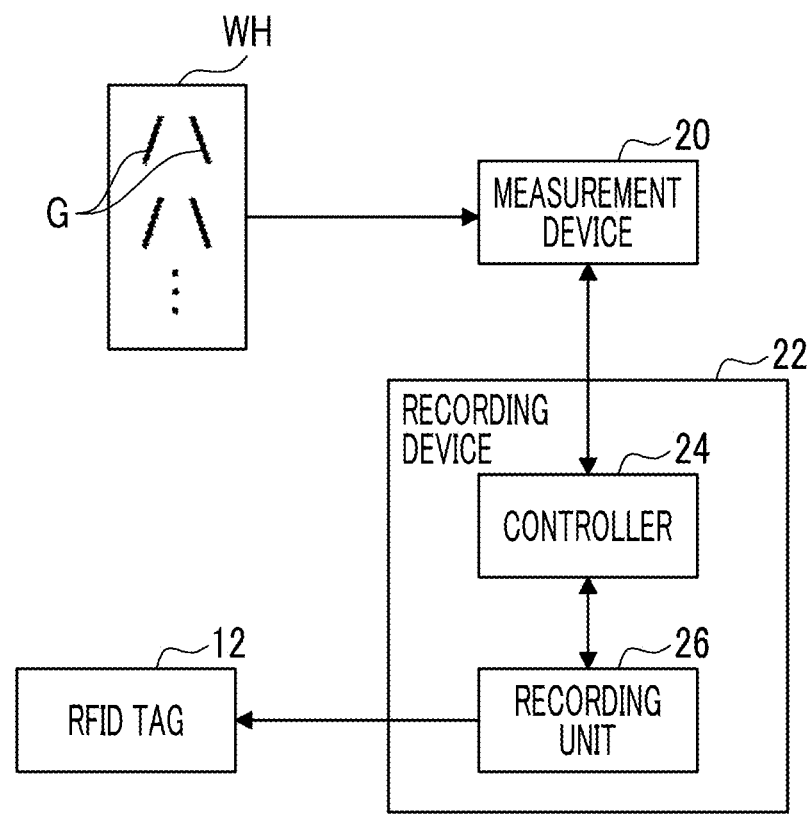
FIG. 6 is a block diagram showing an example of a configuration of a measurement device and a recording device according to each embodiment.

Next, with reference to FIG. 6, a measurement device 20 and a recording device 22 for recording the servo pattern distance information 14 on the RFID tag 12 of the magnetic tape cartridge 10. Examples of the measurement device 20 include a magnetic force microscope (MFM), a scanning electron microscope (SEM), and a laser microscope. As shown in FIG. 6, the recording device 22 includes a controller 24 including a central processing unit (CPU) and a memory as a temporary storage area, and a recording unit 26 which records information on the RFID tag 12 in a contactless manner.

The measurement device 20 performs measurement regarding the servo signal writing head WH of the servo writer SW and outputs a signal corresponding to a distance between two linear patterns of each gap pattern G in the tape longitudinal direction. In addition, the measurement device 20 outputs a signal corresponding to an interval between adjacent gap patterns G in the tape width direction.

Figure 7:
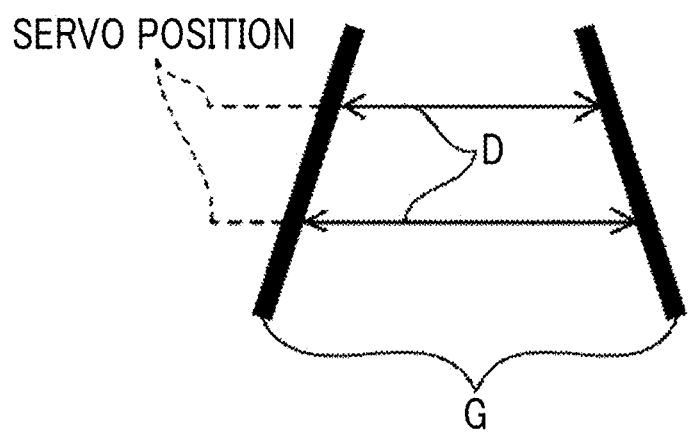
FIG. 7 is a view for describing a distance between linear patterns of a servo pattern according to each embodiment.

The controller 24 of the recording device 22 obtains a signal output from the measurement device 20. As shown in FIG. 7 as an example, the controller 24 derives a distance D between two linear patterns of each gap pattern G in the tape longitudinal direction by using the obtained signal. The controller 24 derives the distance D at each position (hereinafter, referred to as a "servo position") corresponding to the servo pattern SP along the tape width direction. The servo position corresponds to each data track DT of each data track group described above. That is, for example, in a case where each data track group includes six data tracks DT, the servo positions are six positions. The controller 24 controls the recording unit 26 and records the derived distance D on the RFID tag 12 as the servo pattern distance information 14 by associating with the number and the servo position of the servo band SB corresponding to each gap pattern G.

Figures 8, 9:
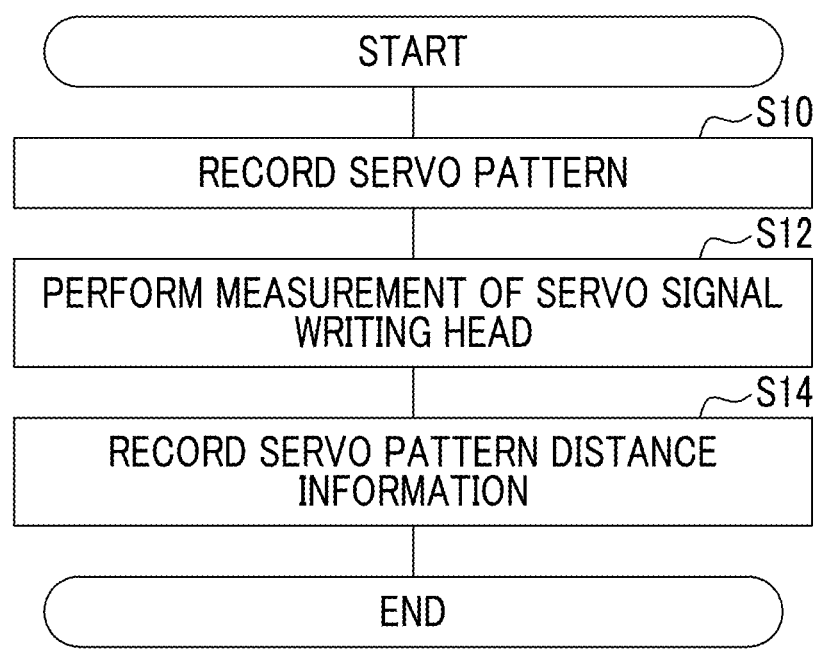
FIG. 8 is a view showing an example of servo pattern distance information according to each embodiment.
FIG. 9 is a flowchart showing an example of a servo recording process according to the first to fourth embodiments.

FIG. 8 shows an example of the servo pattern distance information 14. As shown in FIG. 8, the distance D corresponding to each of a combination of the number and the servo position of the servo band SB is included in the servo pattern distance information 14. The example shown in FIG. 8 shows the distance D at each servo position, in a case where the servo pattern SP, in which an azimuth angle is 12°, a length in the tape width direction is 93 µm, and a distance between the linear pattern SP1 and the linear pattern SP2 at a position of a middle point in the tape width direction (that is, position at 46.5 µm (=93/2)) in the longitudinal direction is 38 is assumed. As shown in FIG. 3, the azimuth angle here is an angle (θ in FIG. 3) of the linear pattern SP1 with respect to a linear line (two-dot chain line in FIG. 3) along the tape width direction in the line-symmetric servo pattern SP.

From this distance D, which servo position the distance D corresponds to is derived based on Expression (1). The "distance at the middle point" in Expression (1) means a distance between the linear pattern SP1 and the linear pattern SP2 in the tape longitudinal direction at the position of the middle point of the servo pattern SP in the tape width direction (in the example of FIG. 8, 38 µm). That is, in Expression (1), the servo position is derived by the distance in the tape width direction based on the position of the middle point of the servo pattern SP in the tape width direction.

$$\text{Servo position} = \frac{\text{Distance at middle point} - \text{Distance } D}{2 \times \tan \text{Azimuth angle}} \quad (1)$$

Next, an example of a flow of a servo recording process of recording the servo pattern SP on the magnetic tape MT of the magnetic tape cartridge 10 and recording the servo pattern distance information 14 on the RFID tag 12 will be described with reference to FIG. 9.

In Step S10 of FIG. 9, as described above, the servo writer SW records the servo pattern SP by the gap pattern G corresponding to the servo signal writing head WH on each servo band SB of the magnetic tape MT, by the control of the control device SW5.

In Step S12, as described above, the measurement device 20 performs measurement regarding the servo signal writing head WH of the servo writer SW used in the process of Step S10 and outputs a signal of the measurement result. In Step S14, as described above, the controller 24 of the recording device 22 derives the distance D by using the signal output by the process of Step S12. The controller 24 controls the recording unit 26 and records the derived distance D on the RFID tag 12 as the servo pattern distance information 14 by associating with the number and the servo position of the servo band SB corresponding to each gap pattern G. In a case where the process of Step S14 ends, the servo recording process ends.

The process procedure of this servo recording process is not limited to the example shown in FIG. 9. For example, after performing the process from Step S12 to Step S14, the process of Step S10 may be performed. The servo pattern SP is recorded on the servo band SB by the process described above and the magnetic tape cartridge 10 in which the servo pattern distance information 14 are recorded on the RFID tag 12 is shipped.

Figure 10:
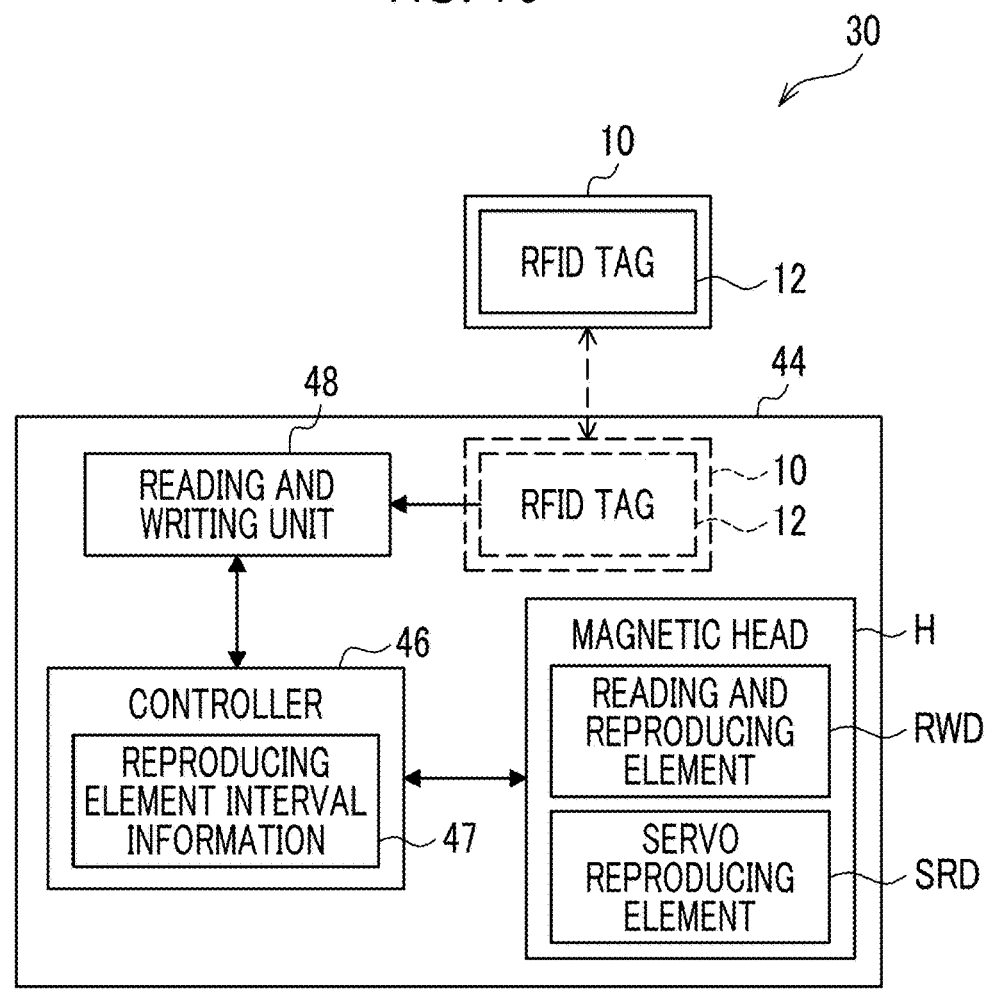
FIG. 10 is a block diagram showing an example of a configuration of a recording and reproducing system according to each embodiment.

Next, a configuration of a recording and reproducing system 30 which performs recording and reproducing of data with respect to the magnetic tape cartridge 10 will be described with reference to FIG. 10. As shown in FIG. 10, the recording and reproducing system 30 comprises the magnetic tape cartridge 10, a tape drive 44, and a computer (not shown) for controlling the tape drive 44. The tape drive 44 is an example of the recording and reproducing apparatus according to the technology of the disclosure.

In the tape drive 44, the magnetic tape cartridge 10 is loaded. In addition, after completing the recording or reproducing of the data with respect to the magnetic tape MT of the magnetic tape cartridge 10 loaded in the tape drive 44, the magnetic tape cartridge 10 is unloaded from the tape drive 44.

The tape drive 44 comprises a controller 46, a reading and writing unit 48, and the magnetic head H. The controller 46 is an example of a selection unit and a controller according to the technology of the disclosure. The magnetic head H comprises the plurality of recording and reproducing elements RWD, and the plurality (in the embodiment, two) of servo reproducing elements SRD corresponding to each of the adjacent servo bands SB. In addition, in the embodiment, the number of recording and reproducing elements RWD comprised in the magnetic head H is the same as the number of data track groups comprised in one data band DB. The number of recording and reproducing elements RWD comprised in the magnetic head H may not be the same as the number of data track groups comprised in one data band DB.

The reading and writing unit 48 reads the information recorded on the RFID tag 12 mounted in the magnetic tape cartridge 10 in a contactless manner and outputs the read information to the controller 46, by the control of the controller 46. The reading and writing unit 48 records information on the RFID tag 12 in a contactless manner by the control of the controller 46. As an example of the reading and writing unit 48, an RFID reader and writer is used.

The controller 46 includes a programmable logic device (PLD), a memory as a temporary storage area, and a non-volatile storage unit. The controller 46 may be realized by a processor other than the PLD, such as a CPU, or may be realized by a plurality of types of processors. For example, in a case where the controller 46 is realized by the CPU, the CPU has the same function as the PLD by executing the program by the CPU.

Figure 11:
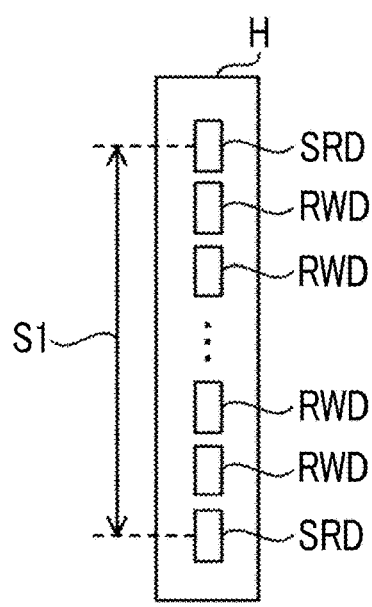
FIG. 11 is a view showing an example of a configuration of a magnetic head according to the first embodiment.

Reproducing element interval information 47 is stored in the storage unit comprised in the controller 46. As shown in FIG. 11 as an example, the reproducing element interval information 47 is information representing an interval S1 in the tape width direction between the servo reproducing elements SRD that read the servo patterns SP adjacent to each other, respectively, along the tape width direction. The interval S1 is measured by a measurement device such as an MFM, an SEM, and a laser microscope in a manufacturing process of the tape drive 44. The tape drive 44 in which the reproducing element interval information 47 representing the interval S1 measured by the measurement device is stored in the storage unit is shipped.

In the embodiment, as shown in FIG. 11, the interval between the centers of the servo reproducing elements SRD is used as the interval S1, but the interval S1 is not limited to this. For example, as the interval S1, the interval between the upper ends of the servo reproducing elements SRD may be used or the interval between the lower ends of the servo reproducing elements SRD may be used. In addition, for example, as the interval S1, a representative value such as an average value or a median value of intervals between a plurality of corresponding positions in the servo reproducing element SRD may be used.

Figure 12:
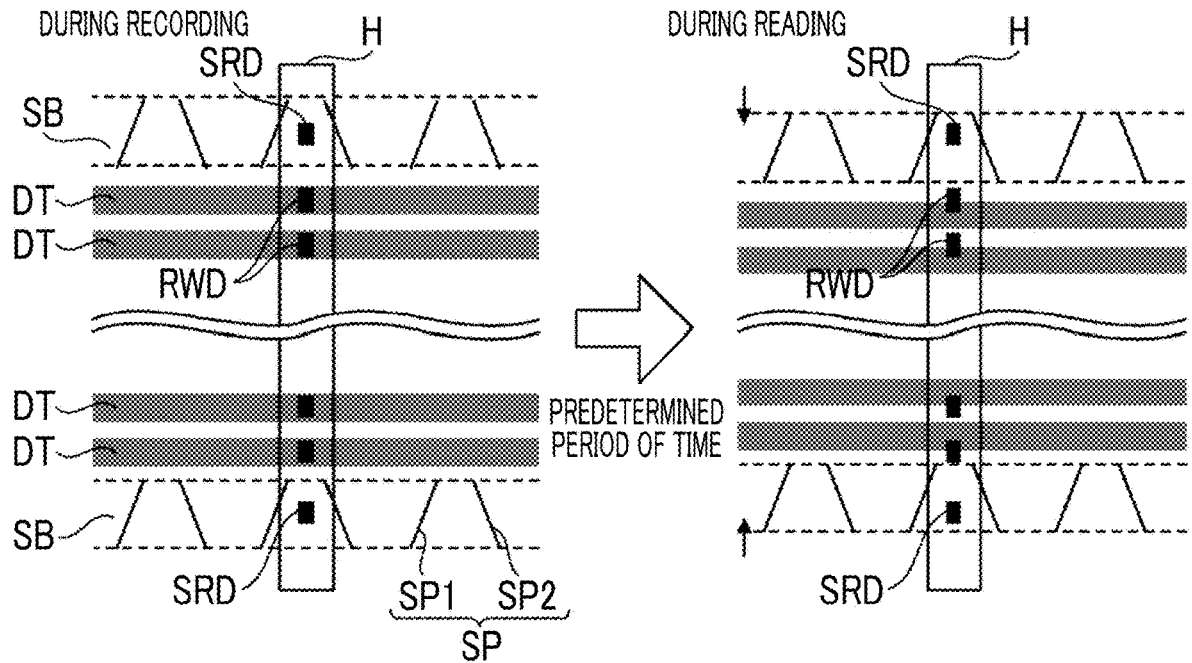
FIG. 12 is a view for describing an effect of deformation of the magnetic tape on positioning of the magnetic head.

However, the magnetic tape MT may be deformed as the storage period becomes longer. In particular, the deformation caused by the magnetic tape MT expanding or contracting along the tape width direction leads to the occurrence of reading failure of the magnetic tape MT. The deformation of the magnetic tape MT simply described hereinafter means the deformation of the magnetic tape MT along the tape width direction. As shown in FIG. 12 as an example, a case where the data is recorded on the magnetic tape MT, in a case where there is no deformation of the magnetic tape MT or in a case where the deformation is relatively small, and the data is read from the magnetic tape MT, in a case where the deformation of the magnetic tape MT after a certain period of time is relatively large, will be described below. In the following description, the data track DT targeted for data recording or reproducing will be referred to as a "target track".

In this case, as shown in FIG. 12, in a case where the magnetic head H is positioned using a reading result of the servo pattern SP by the servo reproducing element SRD as in the recording, the magnetic tape MT is contracted, and thus the recording and reproducing element RWD is deviated from the target track. In a case where the deviation amount in this case exceeds a predetermined value, data reading failure may occur. The deviation amount here is the deviation amount of the recording and reproducing element RWD from the target track, and means the deviation amount along the tape width direction. This deviation amount is expressed by Expression (2), for example. $L_i$ in Expression (2) represents a distance from the servo reproducing element SRD used for positioning to the i-th (i is an integer from 1 to the number of recording and reproducing elements RWD) recording and reproducing element RWD. In addition, TDS in Expression (2) represents a deformation rate of the magnetic tape MT in the tape width direction and represents that the magnetic tape MT is not deformed in a case where TDS is 0%.

$$\text{Deviation amount} = L_i \times TDS \quad (2)$$

Figure 13:
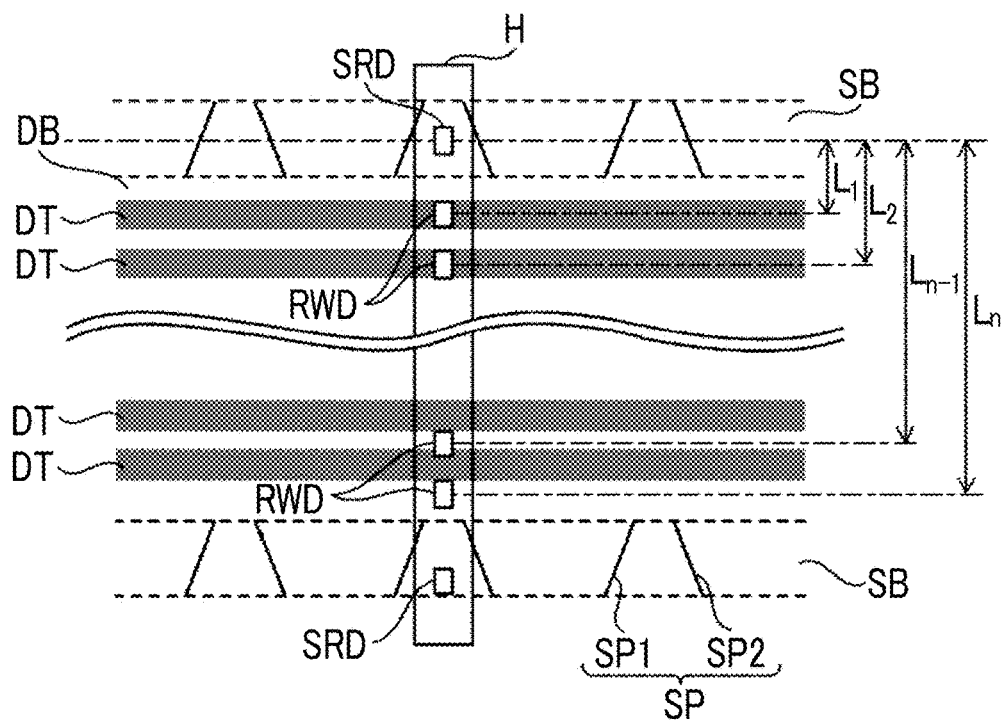
FIG. 13 is a view for describing a deviation amount of the recording and reproducing element in a case where the magnetic head is positioned by using a servo reproducing element on one end side of the magnetic tape.

In addition, as shown in FIG. 13, a case where the magnetic head H is positioned by using only the servo reproducing element SRD on one end side (the upper side in the example of FIG. 13) in the tape width direction among the two servo reproducing elements SRD will be described. Hereinafter, one end in the tape width direction is referred to as "upper" and the other end is referred to as "lower". In this case, as shown in FIG. 13, the larger the distance from the upper servo reproducing element SRD in the tape width direction, the larger the deviation amount.

Therefore, the tape drive 44 according to the embodiment selects one servo reproducing element SRD from the two servo reproducing elements SRD of the magnetic head H according to the position of the target track along the tape width direction. Specifically, the tape drive 44 selects the upper servo reproducing element SRD, in a case where the target track is positioned in the upper half of the data band DB. In this case, the tape drive 44 uses the upper half of the recording and reproducing elements RWD of the plurality of recording and reproducing elements RWD comprised in the magnetic head H to record or reproduce data with respect to the target track. On the other hand, the tape drive 44 selects the lower servo reproducing element SRD, in a case where the target track is positioned in the lower half of the data band DB. In this case, the tape drive 44 uses the lower half of the recording and reproducing elements RWD of the plurality of recording and reproducing elements RWD comprised in the magnetic head H to record or reproduce data with respect to the target track. In other words, the tape drive 44 selects the servo reproducing element SRD closer to the target track. Then, the tape drive 44 positions the magnetic head H along the tape width direction using a reading result of the servo pattern SP by the selected servo reproducing element SRD. In the examples of FIGS. 12 and 13, the case where the magnetic tape MT contracts has been described, but the same applies to a case where the magnetic tape MT expands. In general, the magnetic tape MT tends to extend toward the core side (so-called End Of Tape (EOT)) and contract toward the outside (so-called Beginning Of Tape (BOT)).

Figure 14:
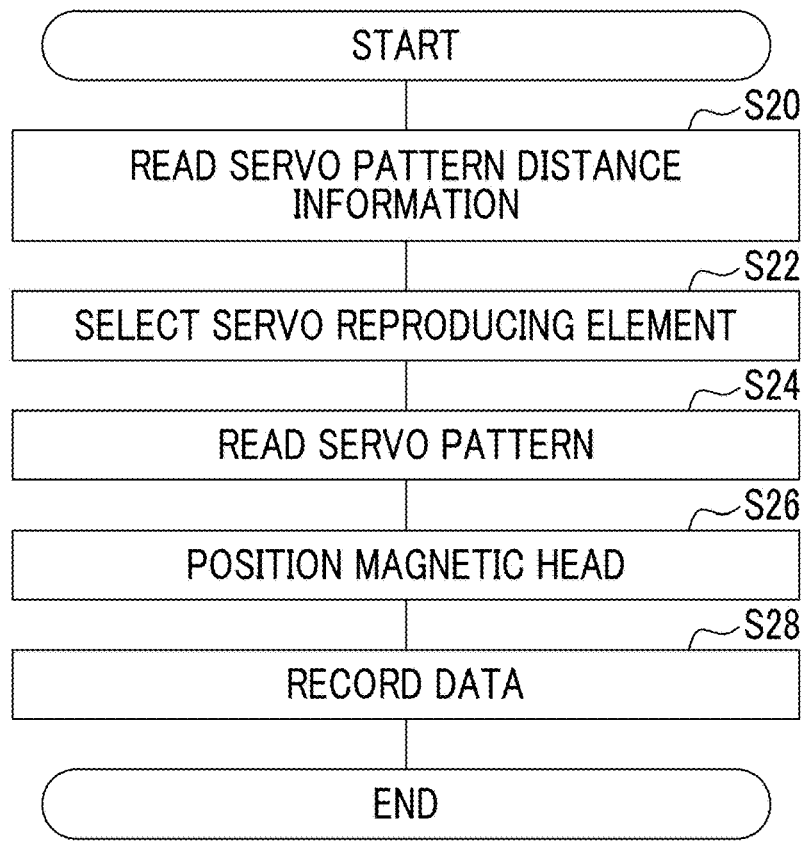
FIG. 14 is a flowchart showing an example of a data recording process according to the first embodiment.

Next, a flow of a data recording process of recording data on the magnetic tape cartridge 10 performed by the recording and reproducing system 30 will be described with reference to FIG. 14. The data recording process shown in FIG. 14 is, for example, performed in a case where data which is a recording target is input to the controller 46 of the tape drive 44 from the computer for controlling the tape drive 44. Here, the data recording process is performed in a state where the magnetic tape cartridge 10 is loaded in the tape drive 44.

In Step S20 of FIG. 14, the controller 46 controls the reading and writing unit 48 and causes the reading of the servo pattern distance information 14 recorded on the RFID tag 12. Then, the controller 46 obtains the servo pattern distance information 14 read by the reading and writing unit 48. The process of Step S20 may be executed immediately after the magnetic tape cartridge 10 is loaded in the tape drive 44. In addition, in a case where the servo pattern distance information 14 has been read before the data recording process shown in FIG. 14 is executed, the servo pattern distance information 14 may be reused. In Step S22, as described above, the controller 46 selects one servo reproducing element SRD from the two servo reproducing elements SRD of the magnetic head H according to the position of the target track along the tape width direction. The position of the target track along the tape width direction is obtained, for example, according to a size of data to be recorded, a size of data already recorded on the magnetic tape MT, and the like.

In Step S24, the controller 46 controls the magnetic head H and causes the servo reproducing element SRD selected in the process of Step S22 to read the predetermined number of servo patterns SP recorded on the servo band SB. In this case, the controller 46 controls a transportation mechanism of pulling out the magnetic tape MT so that a tension of the magnetic tape MT becomes a regulated tension (for example, 0.55 [N]).

In Step S26, the controller 46 performs the positioning of the magnetic head H based on the time interval of the timings at which the linear pattern SP1 and the linear pattern SP2 are read in the process of Step S24, and the servo pattern distance information 14 obtained in the process of Step S20. In Step S28, the controller 46 controls the magnetic head H and records data on the data band DB. In this case, the controller 46 controls a transportation mechanism of pulling the magnetic tape MT so that the tension of the magnetic tape MT becomes regulated tension. In a case where the process of Step S28 ends, the data recording process ends. In a case where the recording of the data to be recorded on the magnetic tape MT is completed by this data recording process, the magnetic tape cartridge 10 is unloaded from the tape drive 44. After the recording of the data to be recorded on the magnetic tape MT is completed, the next operation may be waited without unloading the magnetic tape cartridge 10 from the tape drive 44.

The process of reading the data recorded on the magnetic tape cartridge 10 can also be executed in the same manner as in the data recording process shown in FIG. 14.

As described above, in the embodiment, one servo reproducing element SRD is selected from the servo reproducing elements SRD of the magnetic head H, according to the position of the data track DT targeted for recording or reproducing of data in the data band DB along the tape width direction. Then, the magnetic head H is positioned along the tape width direction using a reading result of the servo pattern SP by the selected servo reproducing element SRD. Therefore, it is possible to prevent a decrease in positioning accuracy of the magnetic head H by positioning the magnetic head H in a state where the deviation amount is relatively small. As a result, it is possible to prevent the occurrence of an error in recording or reproducing data with respect to the magnetic tape MT.

In the first embodiment, it has been described that the data band DB is divided into the upper and lower regions, and the servo reproducing element SRD is selected according to which of the two regions the target track is positioned in, but there is no limitation thereto. For example, the data band DB may be divided into three or more regions, and the servo reproducing element SRD may be selected according to which of the divided regions the target track is positioned in.

Specifically, for example, in a case where the data band DB is divided into three regions and the target track is positioned in an upper region of the data band DB, the servo reproducing element SRD on the upper side is selected, and in a case where the target track is positioned in the lower region, the servo reproducing element SRD on the lower side is selected. In addition, for example, in this case, in a case where the target track is positioned in the central region of the data band DB, both the upper and lower servo reproducing elements SRD are selected.

Second Embodiment

A second embodiment of the technology of the disclosure will be described. The configuration of the recording and reproducing system 30 according to the embodiment is the same as that of the first embodiment except for the magnetic head H, and therefore the configuration of the magnetic head H will be described here.

Figure 15:
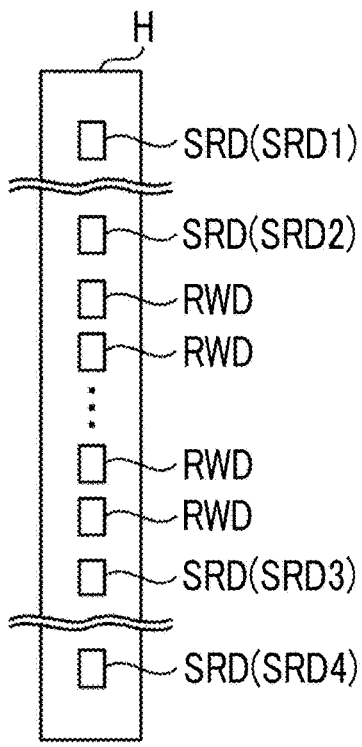
FIG. 15 is a view showing an example of a configuration of the magnetic head according to second to fifth embodiments.

The configuration of the magnetic head H according to the embodiment will be described with reference to FIG. 15. As shown in FIG. 15, the magnetic head H comprises a plurality of recording and reproducing elements RWD and four servo reproducing elements SRD. In the following description, in a case of distinguishing the four servo reproducing elements SRD, the numbers are added in order from the top to the end of the reference numerals, as a servo reproducing element SRD1 to a servo reproducing element SRD4.

The recording and reproducing element RWD is arranged along the tape width direction between a servo reproducing element SRD2 and a servo reproducing element SRD3. In addition, the number of recording and reproducing elements RWD simultaneously used during the recording or reproducing operation is smaller than the number of data track groups included in one data band DB. Specifically, the number of recording and reproducing elements RWD simultaneously used during the recording or reproducing operation is half the number of data track groups included in one data band DB. For example, in a case where there are 64 data track groups in one data band DB, the number of recording and reproducing elements RWD simultaneously used during the recording or reproducing operation is 32. The number of the servo reproducing elements SRD described above is twice a ratio of the number of the data track groups included in one data band DB to the number of the recording and reproducing elements RWD simultaneously used during the recording or reproducing operation (4=(64/32)×2). In addition, the plurality of recording and reproducing elements RWD are arranged at intervals corresponding to the data track groups continuous in the tape width direction.

Figure 16:
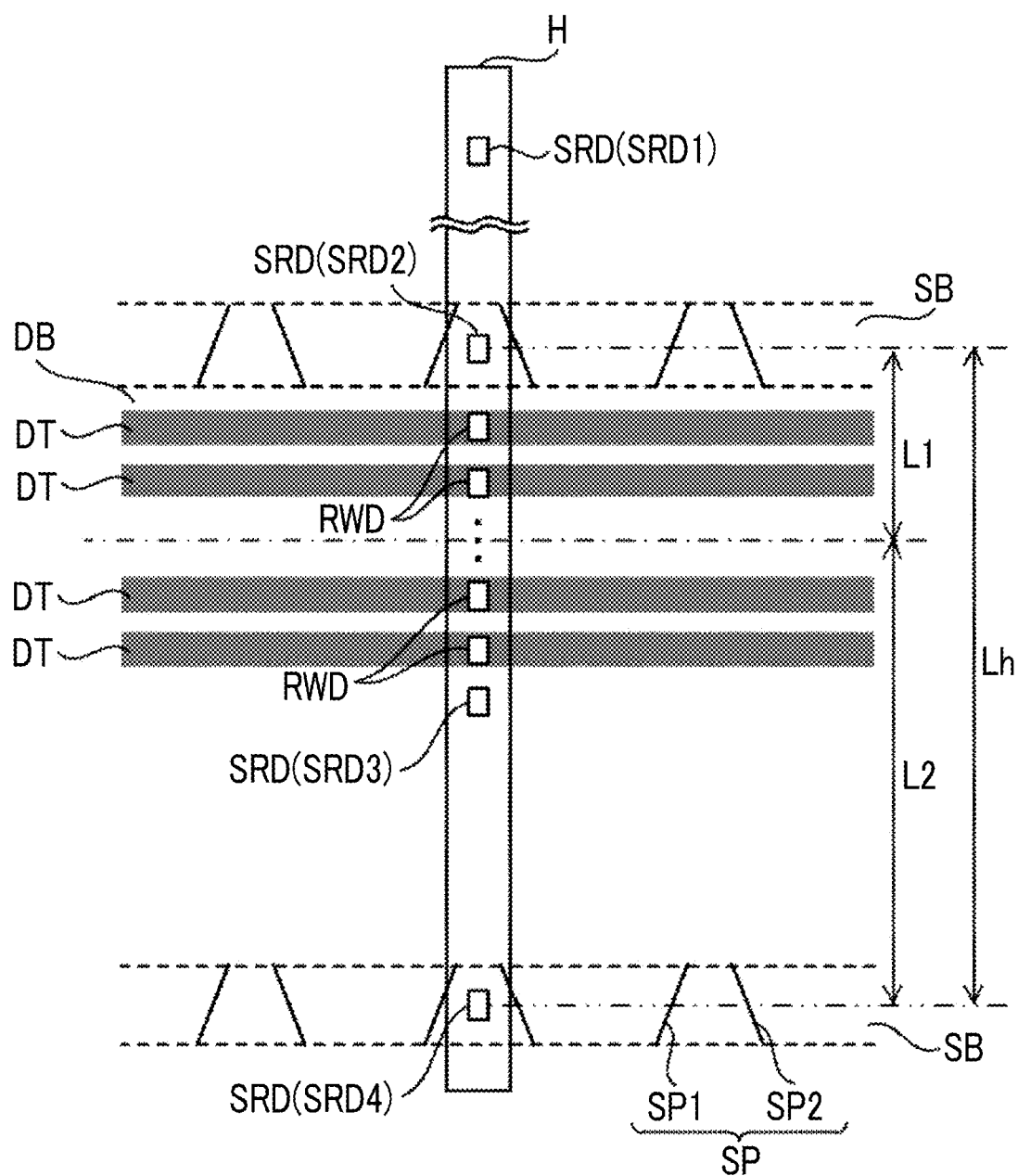
FIG. 16 is a view for describing a selection process of the servo reproducing element.
Figure 17:
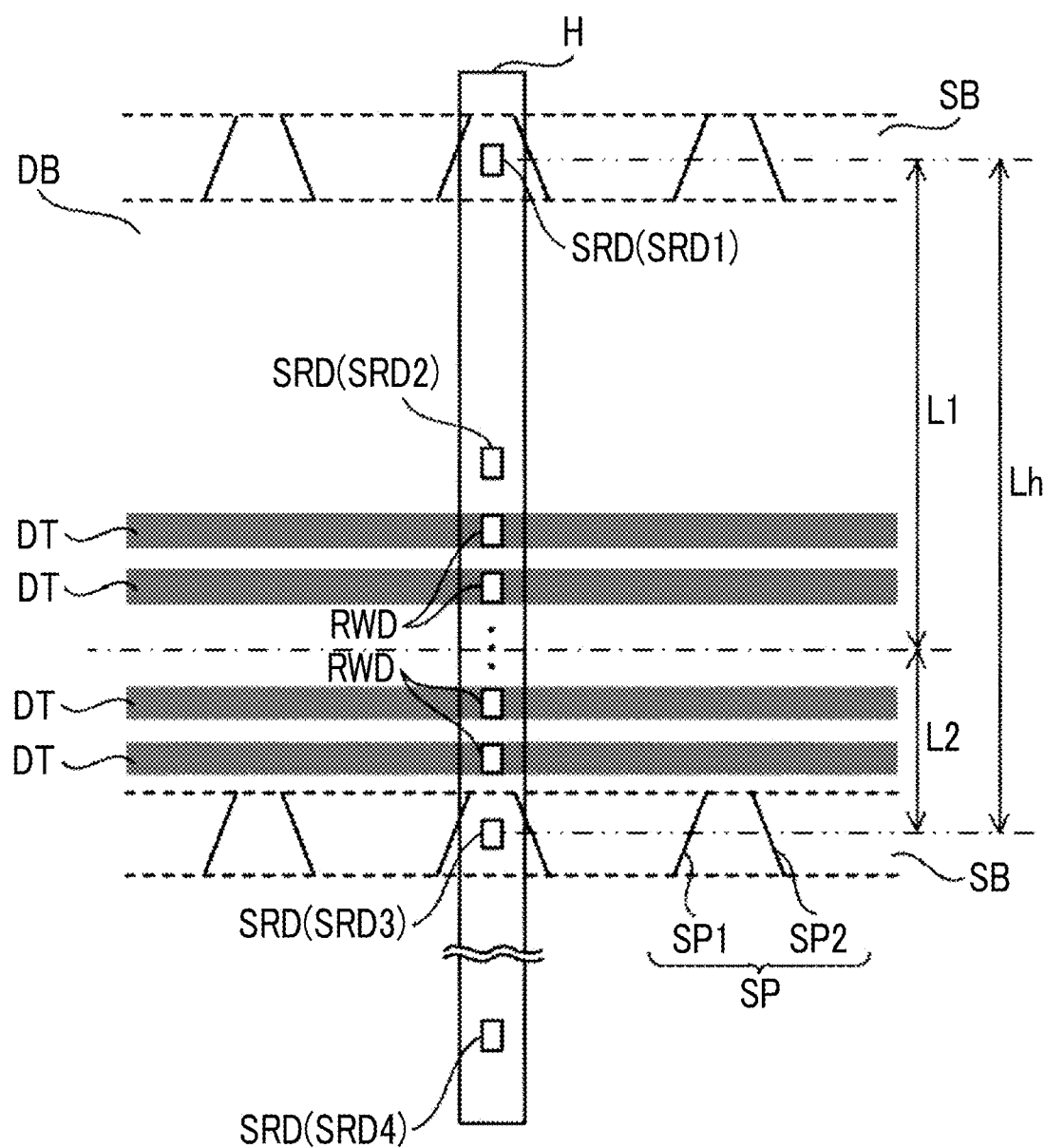
FIG. 17 is a view for describing the selection process of the servo reproducing element.

The tape drive 44 according to the embodiment selects two servo reproducing elements SRD from the four servo reproducing elements SRD of the magnetic head H according to the position of the target track along the tape width direction. Specifically, as shown in FIG. 16, the tape drive 44 selects the servo reproducing element SRD2 and the servo reproducing element SRD4, in a case where the target track is positioned in the upper half of the data band DB. Meanwhile, as shown in FIG. 17, the tape drive 44 selects the servo reproducing element SRD1 and the servo reproducing element SRD3, in a case where the target track is positioned in the lower half of the data band DB.

Then, the tape drive 44 positions the magnetic head H along the tape width direction using a reading result of the servo pattern SP by the selected servo reproducing elements SRD. In the embodiment, the tape drive 44 positions the magnetic head H so that the center (one-dot chain line in FIGS. 16 and 17) of the recording and reproducing elements RWD at both ends of the magnetic head H along the tape width direction follows the center in the upper half or the lower half region where the target track is positioned, along the tape width direction.

Next, details of the positioning process of the magnetic head H according to the embodiment will be described. Hereinafter, as shown in FIGS. 16 and 17, the interval between the two selected servo reproducing elements SRD in the tape width direction is referred to as an interval Lh. In the embodiment, the reproducing element interval information 47 includes this interval Lh for each set of servo reproducing elements SRD. In the following description, a distance from the center of the recording and reproducing elements RWD at both ends of the magnetic head H along the tape width direction to the upper servo reproducing element SRD of the two selected servo reproducing elements SRD is referred to as a distance L1. In addition, in the following description, a distance from the center of the recording and reproducing elements RWD at both ends of the magnetic head H along the tape width direction to the lower servo reproducing element SRD of the two selected servo reproducing elements SRD is referred to as a distance L2.

Figure 18:
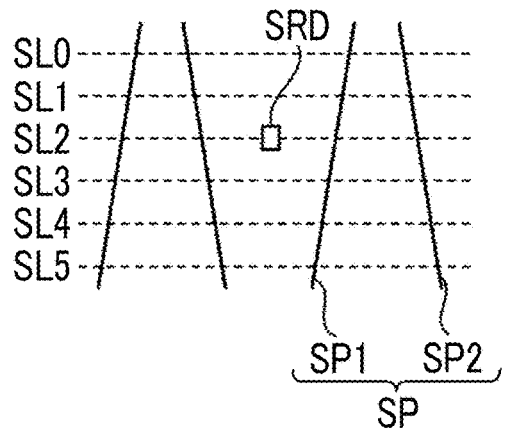
FIG. 18 is a view showing an example of a servo position according to the second embodiment.

In addition, hereinafter, for ease of understanding of the description, a case where there are six servo positions SL0 to SL5 as shown in FIG. 18 will be described as an example. In addition, here, in a case where the magnetic head H is positioned at a target position, in a case where the magnetic tape MT is in an ideal state and the two selected servo reproducing elements SRD are made to follow the servo position SL2, will be described. The ideal state here means a state where the magnetic tape MT is not deformed from the initial state.

In addition, hereinafter, a ratio of the distance L1 to the distance L2 is described as m:n. In the example of FIG. 16, m:n is approximately 1:3. The distance L1 and the distance L2 are represented by Expressions (3) and (4).

$$L1 = \frac{m}{m+n} \times Lh \quad (3)$$

$$L2 = \frac{n}{m+n} \times Lh \quad (4)$$

Figure 19:
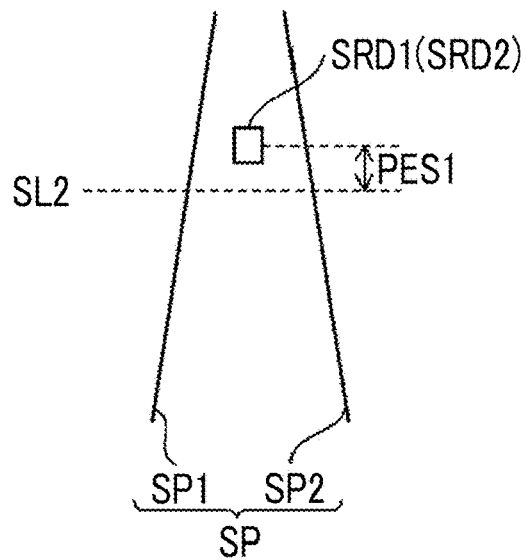
FIG. 19 is a view for describing a deviation amount of the servo reproducing element from a target position.
Figure 19:
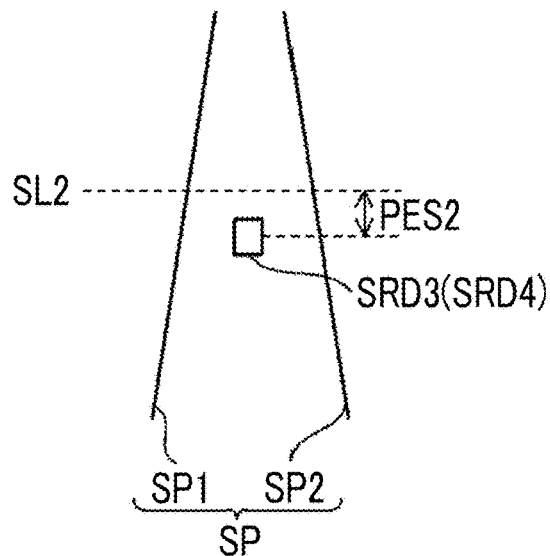

In addition, hereinafter, as shown in FIG. 19, the deviation amount of the upper servo reproducing element SRD of the two selected servo reproducing elements SRD from a target servo position (hereinafter referred to as "target position", SL2 in the example of FIG. 19) along the tape width direction is represented by PES1. In addition, hereinafter, as shown in FIG. 19, the deviation amount of the lower servo reproducing element SRD of the two selected servo reproducing elements SRD from the target position along the tape width direction is represented as PES2.

In a case where a deformation rate of the magnetic tape MT in the tape width direction is defined as TDS and there is no deformation of the magnetic tape MT in a case where TDS is 0%, the deviation amount PES1 and the deviation amount PES2 are expressed by Expression (5) and Expression (6).

$$PES1 = L1 \times TDS = \frac{m}{m+n} \times Lh \times TDS \quad (5)$$

-continued $$PES2 = L2 \times TDS = \frac{n}{m+n} \times Lh \times TDS \quad (6)$$

That is, a relationship between PES1 and PES2 is expressed by Expression (7).

$$PES1 = \frac{m}{n} \times PES2 \quad (7)$$

Accordingly, in a case where the magnetic tape MT is deformed in the tape width direction, the magnetic head H is positioned so that PES1:PES2, which is the ratio of the deviation amount PES1 to the deviation amount PES2, is m:n, which is the ratio of the distance L1 to the distance L2, thereby positioning the magnetic head H at the target position.

Figure 20:
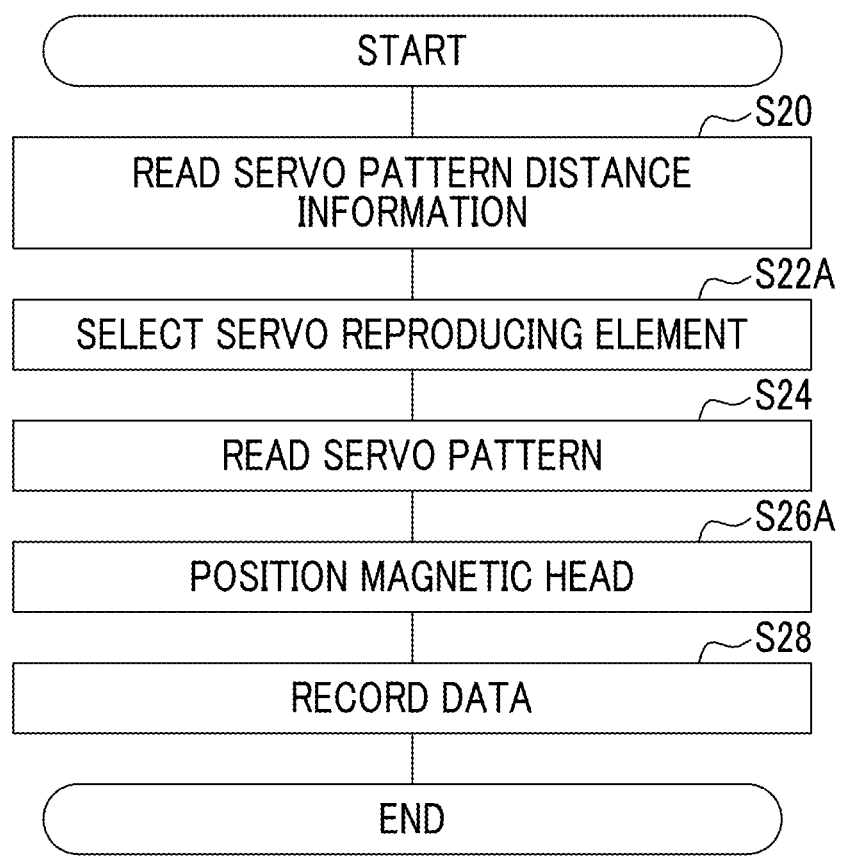
FIG. 20 is a flowchart showing an example of the data recording process according to the second embodiment.

Next, a flow of a data recording process of recording data on the magnetic tape cartridge 10 performed by the recording and reproducing system 30 will be described with reference to FIG. 20. The data recording process shown in FIG. 20 is, for example, performed in a case where data which is a recording target is input to the controller 46 of the tape drive 44 from the computer for controlling the tape drive 44. Here, the data recording process is performed in a state where the magnetic tape cartridge 10 is loaded in the tape drive 44. In addition, the same number of steps are used for the steps in FIG. 20 that execute the same processing as in FIG. 14 and description thereof will be omitted.

In Step S22A of FIG. 20, as described above, the controller 46 selects two servo reproducing element SRD from the four servo reproducing elements SRD of the magnetic head H according to the position of the target track along the tape width direction.

In Step S26A, the controller 46 performs the positioning of the magnetic head H based on the time interval of the timings at which the linear pattern SP1 and the linear pattern SP2 are read in the process of Step S24, and the servo pattern distance information 14 obtained in the process of Step S20. In this case, as described above, the controller 46 positions the magnetic head H so that the PES1:PES2, which is the ratio of the deviation amount PES1 to the deviation amount PES2, is m:n, which is the ratio of the distance L1 to the distance L2.

The process of reading the data recorded on the magnetic tape cartridge 10 can also be executed in the same manner as in the data recording process shown in FIG. 20.

As described above, also in the embodiment, it is possible to prevent a decrease in the positioning accuracy of the magnetic head H, and as a result, it is possible to prevent the occurrence of an error in recording or reproducing data with respect to the magnetic tape MT.

Third Embodiment

A third embodiment of the technology of the disclosure will be described. In the second embodiment, a case where a tension of the magnetic tape MT during the recording or reproducing of the data is set to a regulated tension has been described. In the embodiment, an example in which the tension of the magnetic tape MT during the recording or reproduction of the data is controlled in a different manner from the second embodiment will be described. The configuration of the recording and reproducing system 30 according to the embodiment is the same as that in the second embodiment, and therefore the description thereof will be omitted.

Figure 21:
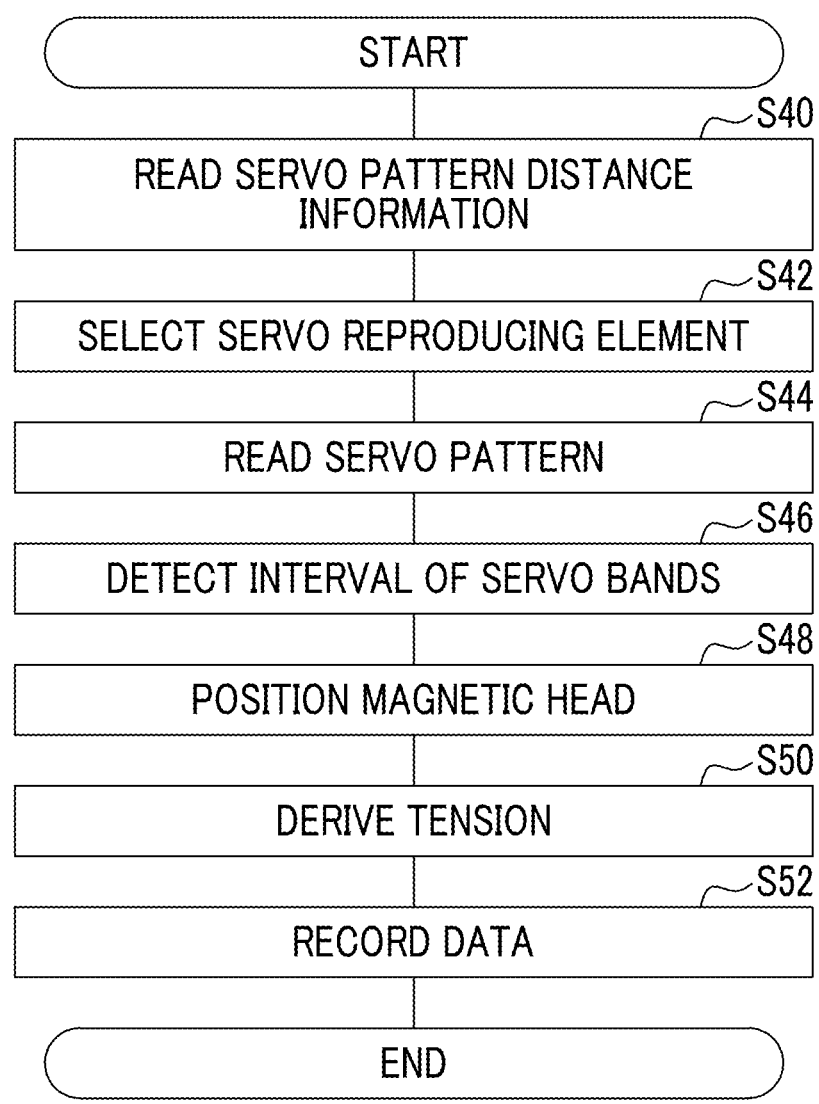
FIG. 21 is a flowchart showing an example of the data recording process according to the third embodiment.

Next, a flow of a data recording process of recording data on the magnetic tape cartridge 10 performed by the recording and reproducing system 30 will be described with reference to FIG. 21. The data recording process shown in FIG. 21 is, for example, performed in a case where data which is a recording target is input to the controller 46 of the tape drive 44 from the computer for controlling the tape drive 44. Here, the data recording process is performed in a state where the magnetic tape cartridge 10 is loaded in the tape drive 44.

In Step S40 of FIG. 21, the controller 46 controls the reading and writing unit 48 and causes the reading of the servo pattern distance information 14 recorded on the RFID tag 12, in the same manner as in Step S20. Then, the controller 46 obtains the servo pattern distance information 14 read by the reading and writing unit 48. The process of Step S40 may be executed immediately after the magnetic tape cartridge 10 is loaded in the tape drive 44. In addition, in a case where the servo pattern distance information 14 has been read before the data recording process shown in FIG. 21 is executed, the servo pattern distance information 14 may be reused. In Step S42, the controller 46 selects two servo reproducing elements SRD from the four servo reproducing elements SRD of the magnetic head H according to the position of the target track along the tape width direction, in the same manner as in Step S22A.

In Step S44, the controller 46 controls the magnetic head H and causes the servo reproducing element SRD selected in the process of Step S42 to read the predetermined number of servo patterns SP recorded on the servo band SB, in the same manner as in Step S24.

In Step S46, the controller 46 detects the interval between the adjacent servo bands SB in the tape width direction based on the read result of the step S44. Hereinafter, this interval is referred to as an "interval K1". Specifically, the controller 46 converts a time interval of timings at which the linear pattern SP1 and the linear pattern SP2 are read by each servo reproducing element SRD selected in Step S42 into a distance between the linear pattern SP1 and the linear pattern SP2 in the tape longitudinal direction. The controller 46 derives the servo position of each servo reproducing element SRD based on Expression (1) by using the distance obtained by the conversion. Then, the controller 46 detects the interval K1 by adding a difference between the derived servo positions of the servo reproducing elements SRD to the interval S1 represented by the reproducing element interval information 47.

In Step S48, the controller 46 performs the positioning of the magnetic head H based on the time interval of the timings at which the linear pattern SP1 and the linear pattern SP2 are read in the process of Step S44, and the servo pattern distance information 14 obtained in the process of Step S40.

In Step S50, the controller 46 derives the tension of the magnetic tape MT in which the interval K1 detected by the process of Step S46 becomes the interval K2 predetermined according to the standard of the magnetic tape MT and the like. For example, in a case where the interval K1 is longer than the interval K2, the controller 46 derives a tension larger than the regulated tension by the difference between the intervals K1 and K2. On the other hand, in a case where the interval K1 is shorter than the interval K2, the controller 46 derives a tension smaller than the regulated tension by the difference between the intervals K1 and K2.

In Step S52, the controller 46 controls the magnetic head H and records data on the data band DB. In this case, the controller 46 controls a transportation mechanism of pulling the magnetic tape MT so that the tension of the magnetic tape MT becomes a tension derived by the process of the step S50. In a case where the process of Step S52 ends, the data recording process ends. In a case where the recording of the data to be recorded on the magnetic tape MT is completed by this data recording process, the magnetic tape cartridge 10 is unloaded from the tape drive 44. After the recording of the data to be recorded on the magnetic tape MT is completed, the next operation may be waited without unloading the magnetic tape cartridge 10 from the tape drive 44.

The process of reading the data recorded on the magnetic tape cartridge 10 can also be executed in the same manner as in the data recording process shown in FIG. 21.

As described above, according to the embodiment, the intervals between the adjacent servo bands SB in the tape width direction are controlled to be regular intervals during recording and reproduction of data. Therefore, it is possible to prevent a decrease in the positioning accuracy of the magnetic head H.

Fourth Embodiment

A fourth embodiment of the technology of the disclosure will be described. In the embodiment, an example in which the tension of the magnetic tape MT during the recording and reproduction of the data is controlled in a different manner from the second embodiment and the third embodiment will be described. The configuration of the recording and reproducing system 30 according to the embodiment is the same as that in the second embodiment, and therefore the description thereof will be omitted.

Figure 22:
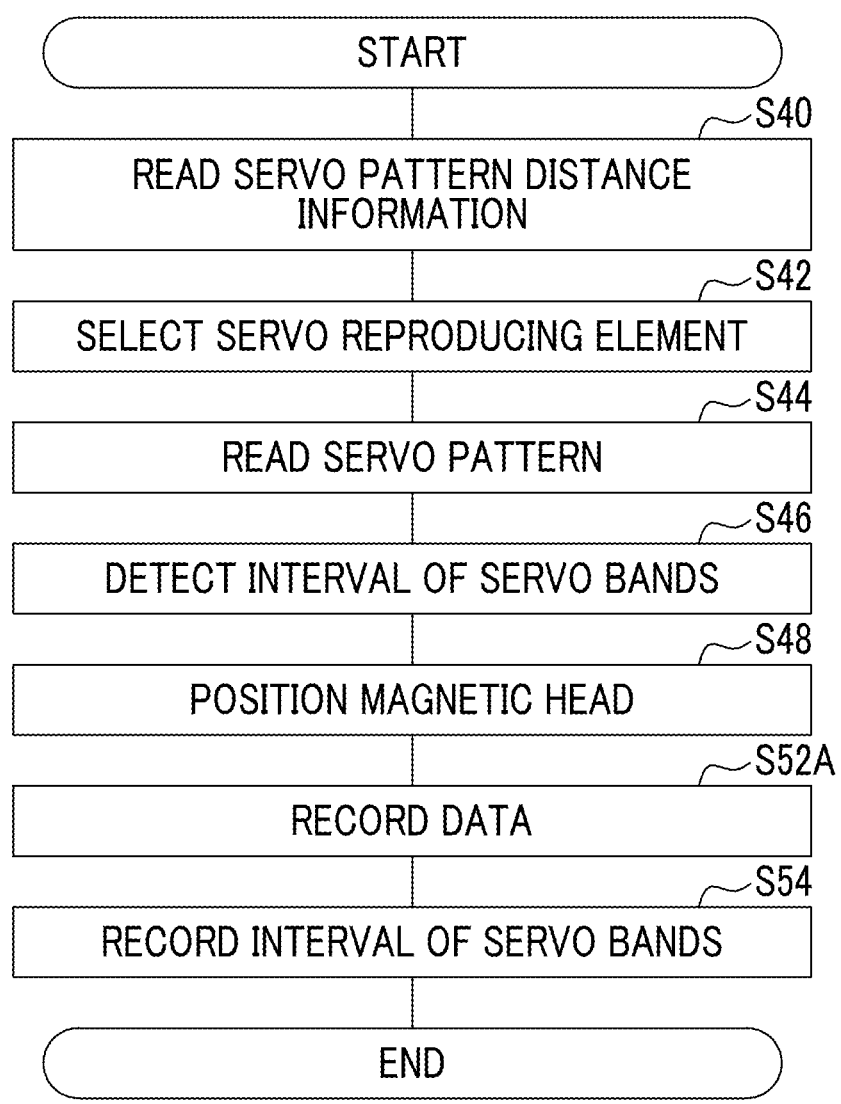
FIG. 22 is a flowchart showing an example of the data recording process according to the fourth embodiment.

Next, a flow of a data recording process of recording data on the magnetic tape cartridge 10 performed by the recording and reproducing system 30 will be described with reference to FIG. 22. The data recording process shown in FIG. 22 is, for example, performed in a case where data which is a recording target is input to the controller 46 of the tape drive 44 from the computer for controlling the tape drive 44. Here, the data recording process is performed in a state where the magnetic tape cartridge 10 is loaded in the tape drive 44. In addition, the same number of steps are used for the steps in FIG. 22 that execute the same processing as in FIG. 21 and description thereof will be omitted.

In Step S52A of FIG. 22, the controller 46 controls the magnetic head H and records data on the data band DB. In this case, the controller 46 controls a transportation mechanism of pulling the magnetic tape MT so that the tension of the magnetic tape MT becomes regulated tension.

In Step S54, the controller 46 controls the reading and writing unit 48 and records the interval K1 between the adjacent servo bands SB detected in the process of Step S46 in tape width direction in the RFID tag 12. The controller 46 may record the information indicating the interval K1 in a management region of the data track DT. In a case where the process of Step S54 ends, the data recording process ends. In a case where the recording of the data to be recorded on the magnetic tape MT is completed by this data recording process, the magnetic tape cartridge 10 is unloaded from the tape drive 44. After the recording of the data to be recorded on the magnetic tape MT is completed, the next operation may be waited without unloading the magnetic tape cartridge 10 from the tape drive 44.

Figure 23:
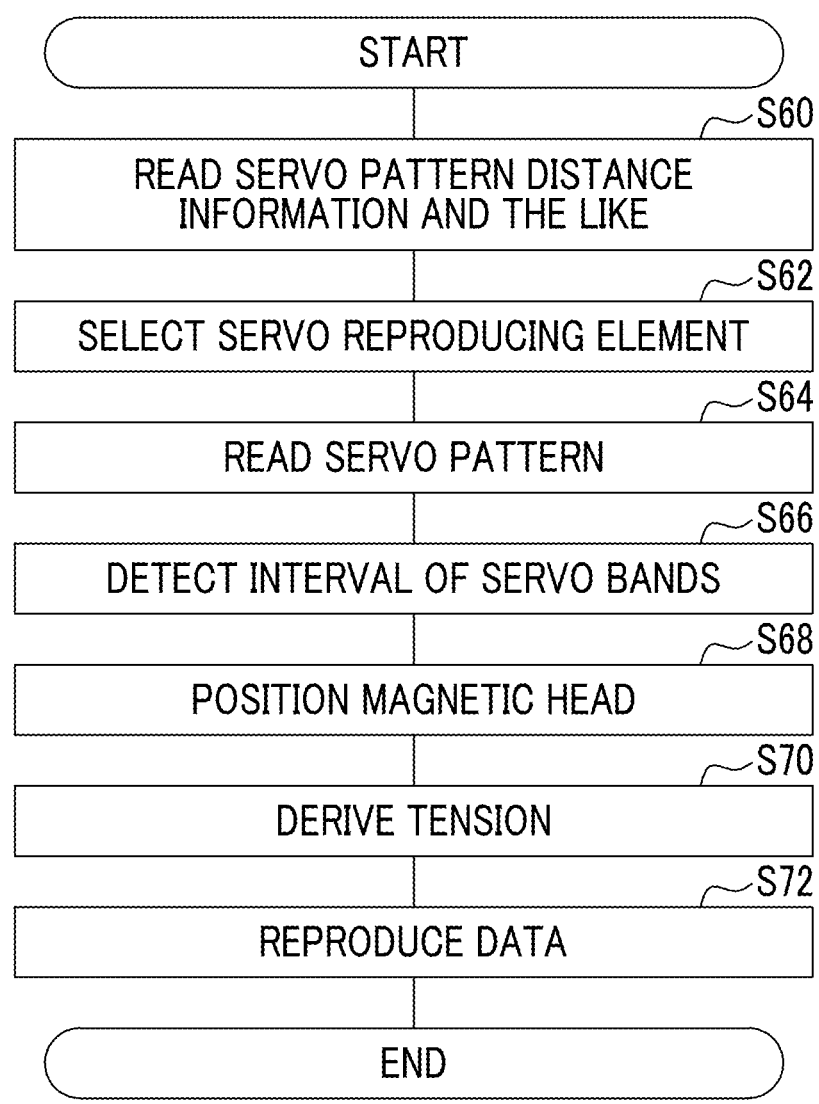
FIG. 23 is a flowchart showing an example of the data reproducing process according to the fourth embodiment.

Next, a flow of the data reproducing process in which the recording and reproducing system 30 reproduces the data recorded on the magnetic tape cartridge 10 will be described with reference to FIG. 23. The data reproducing process shown in FIG. 23 is, for example, performed in a case where a command for reproducing data is input to the controller 46 of the tape drive 44 from the computer for controlling the tape drive 44. Here, the data reproducing process is performed in a state where the magnetic tape cartridge 10 is loaded on the tape drive 44.

In Step S60 of FIG. 23, the controller 46 controls the reading and writing unit 48 and causes the reading of the servo pattern distance information 14 and the interval K1 during the recording of data recorded on the RFID tag 12. Then, the controller 46 obtains the servo pattern distance information 14 and the interval K1 read by the reading and writing unit 48. The process of Step S60 may be executed immediately after the magnetic tape cartridge 10 is loaded in the tape drive 44. In addition, in a case where the servo pattern distance information 14 has been read before the data reproducing process shown in FIG. 23 is executed, the servo pattern distance information 14 may be reused. In Step S62, the controller 46 selects two servo reproducing element SRD from the four servo reproducing elements SRD of the magnetic head H according to the position of the target track along the tape width direction, in the same manner as in Step S42.

In Step S64, the controller 46 controls the magnetic head H and causes the servo reproducing element SRD selected in the process of Step S62 to read the predetermined number of servo patterns SP recorded on the servo band SB, in the same manner as in Step S44.

In Step S66, the controller 46 detects the interval K1 between the adjacent servo bands SB in the tape width direction based on the read result of the step S64, in the same manner as in the step S46. In the following description, in order to distinguish the interval K1, the interval K1 during the recording of data obtained by the process of Step S60 is referred to as an "interval K1r". In addition, hereinafter, the interval K1 during the reproducing of data detected by the process of Step S66 is referred to as an "interval K1p".

In Step S68, the controller 46 performs the positioning of the magnetic head H based on the time interval of the timings at which the linear pattern SP1 and the linear pattern SP2 are read in Step S64, and the servo pattern distance information 14 obtained in the process of Step S60, in the same manner as in Step S48.

In Step S70, the controller 46 derives the tension of the magnetic tape MT in which the interval K1p detected by the process of Step S66 becomes the interval K1r obtained in the process of Step S60. For example, in a case where the interval K1p is longer than the interval K1r, the controller 46 derives a tension larger than the regulated tension by the difference between the intervals K1r and K1p. On the other hand, in a case where the interval K1p is shorter than the interval K1r, the controller 46 derives a tension smaller than the regulated tension by the difference between the intervals K1r and K1p.

In the step S72, the controller 46 controls the magnetic head H and reproduces the data recorded on the data band DB. In this case, the controller 46 controls a transportation mechanism of pulling the magnetic tape MT so that the tension of the magnetic tape MT becomes a tension derived by the process of the step S70. In a case where the process of the step S72 ends, this data reproducing process ends. In a case where the reproducing of the data to be reproduced is completed by this data reproducing process, the magnetic tape cartridge 10 is unloaded from the tape drive 44. After the reproducing of the data to be reproduced from the magnetic tape MT is completed, the next operation may be waited without unloading the magnetic tape cartridge 10 from the tape drive 44.

As described above, according to the embodiment, the intervals between the adjacent servo bands SB in the tape width direction are controlled to be the same intervals as in the recording of data, during the reproduction of data. Therefore, it is possible to prevent a decrease in the positioning accuracy of the magnetic head H.

Fifth Embodiment

A fifth embodiment of the technology of the disclosure will be described. In the embodiment, an example in which the tension of the magnetic tape MT during the recording and reproduction of the data is controlled in a different manner from the second to fourth embodiments will be described. The configuration of the recording and reproducing system 30 according to the embodiment is the same as that of the fourth embodiment except for the information recorded on the RFID tag 12, and therefore the information recorded on the RFID tag 12 will be described here.

Figure 24:
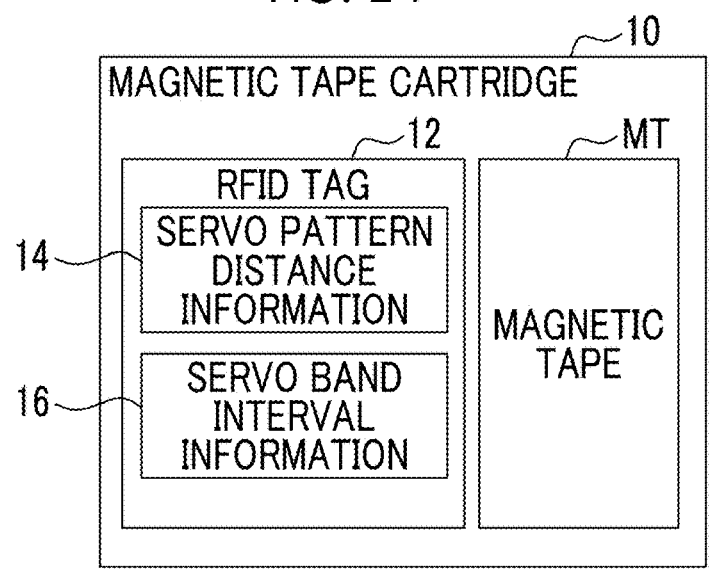
FIG. 24 is a block diagram showing an example of a configuration of a magnetic tape cartridge according to the fifth embodiment.

As shown in FIG. 24, servo band interval information 16 is recorded on the RFID tag 12 according to the embodiment in addition to the servo pattern distance information 14.

Figure 25:
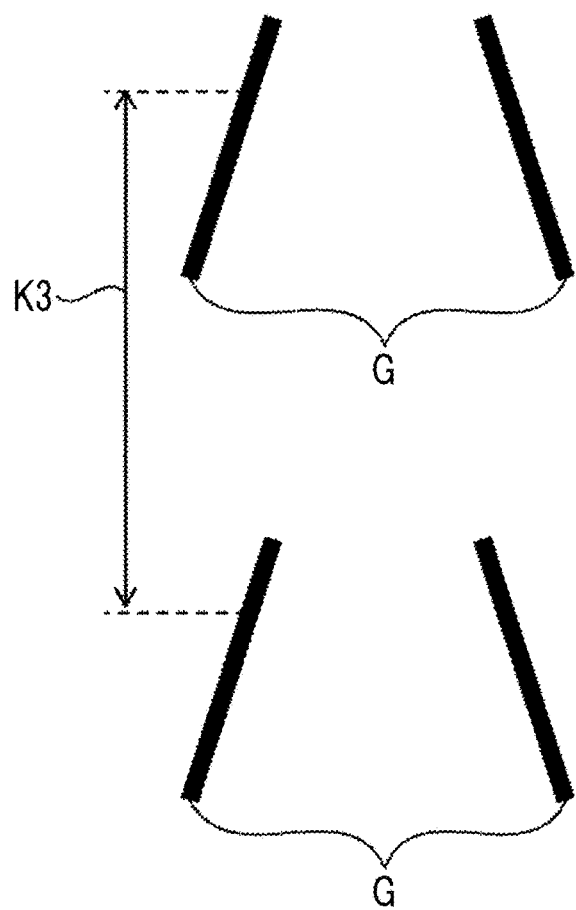
FIG. 25 is a view for describing an interval between gap patterns adjacent to each other according to the fifth embodiment.

As an example shown in FIG. 25, the controller 24 of the recording device 22 according to the embodiment derives an interval K3 between servo positions corresponding to adjacent gap patterns G in the tape width direction by using the obtained signal. The controller 24 derives the interval K3 of each servo position of each combination of adjacent gap patterns G. In addition, the controller 24 controls the recording unit 26 and records the derived interval K3 which is included in the servo band interval information 16 on the RFID tag 12, by associating with the number of the data band DB between the adjacent gap patterns G and the position (hereinafter, referred to as "wrap position") in the data band corresponding to the servo position.

Figures 26, 27:
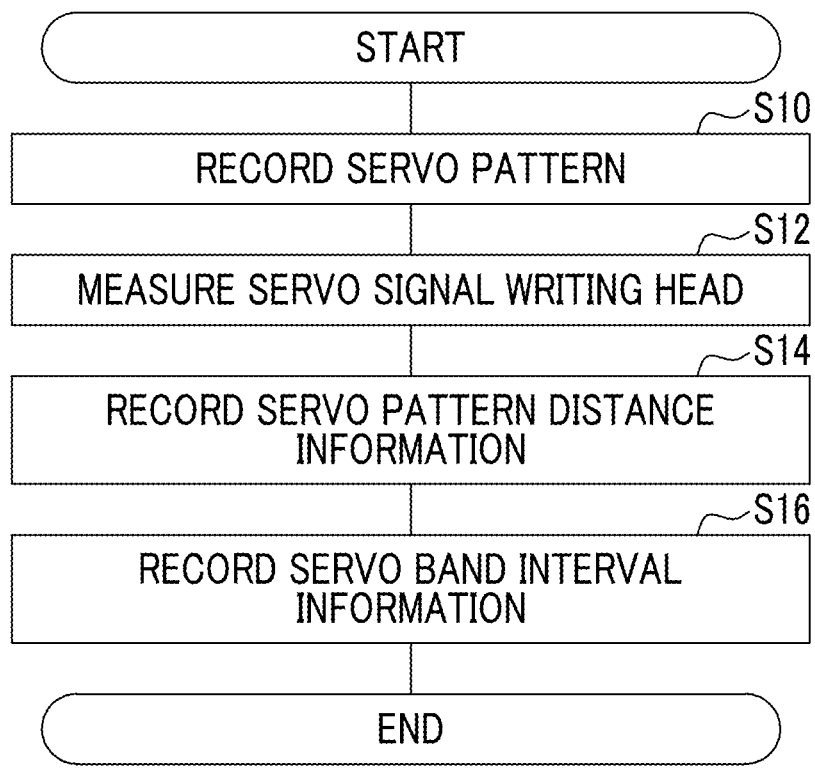
FIG. 26 is a view showing an example of servo band interval information according to the fifth embodiment.
FIG. 27 is a flowchart showing an example of a servo recording process according to the fifth embodiment.

FIG. 26 shows an example of the servo band interval information 16. As shown in FIG. 26, the servo band interval information 16 includes the interval K3 corresponding to each combination of the number of the data band DB and the wrap position.

Next, an example of a flow of a recording process of recording the servo pattern SP on the magnetic tape MT of the magnetic tape cartridge 10 and recording the servo pattern distance information 14 and the servo band interval information 16 on the RFID tag 12 according to the embodiment will be described with reference to FIG. 27. The same number of steps are used for the steps in FIG. 27 that execute the same processing as in FIG. 9 and description thereof will be omitted.

In a case where the process of Step S14 of FIG. 27 ends, the process proceeds to Step S16. In Step S16, as described above, the controller 24 of the recording device 22 derives the interval K3 by using the signal output in the process of the step S12. In addition, the controller 24 controls the recording unit 26 and records the derived interval K3 which is included in the servo band interval information 16 on the RFID tag 12, by associating with the number of the data band DB between the adjacent gap patterns G and the wrap position corresponding to the servo position. In a case where the process of Step S16 ends, this recording process ends.

Figure 28:
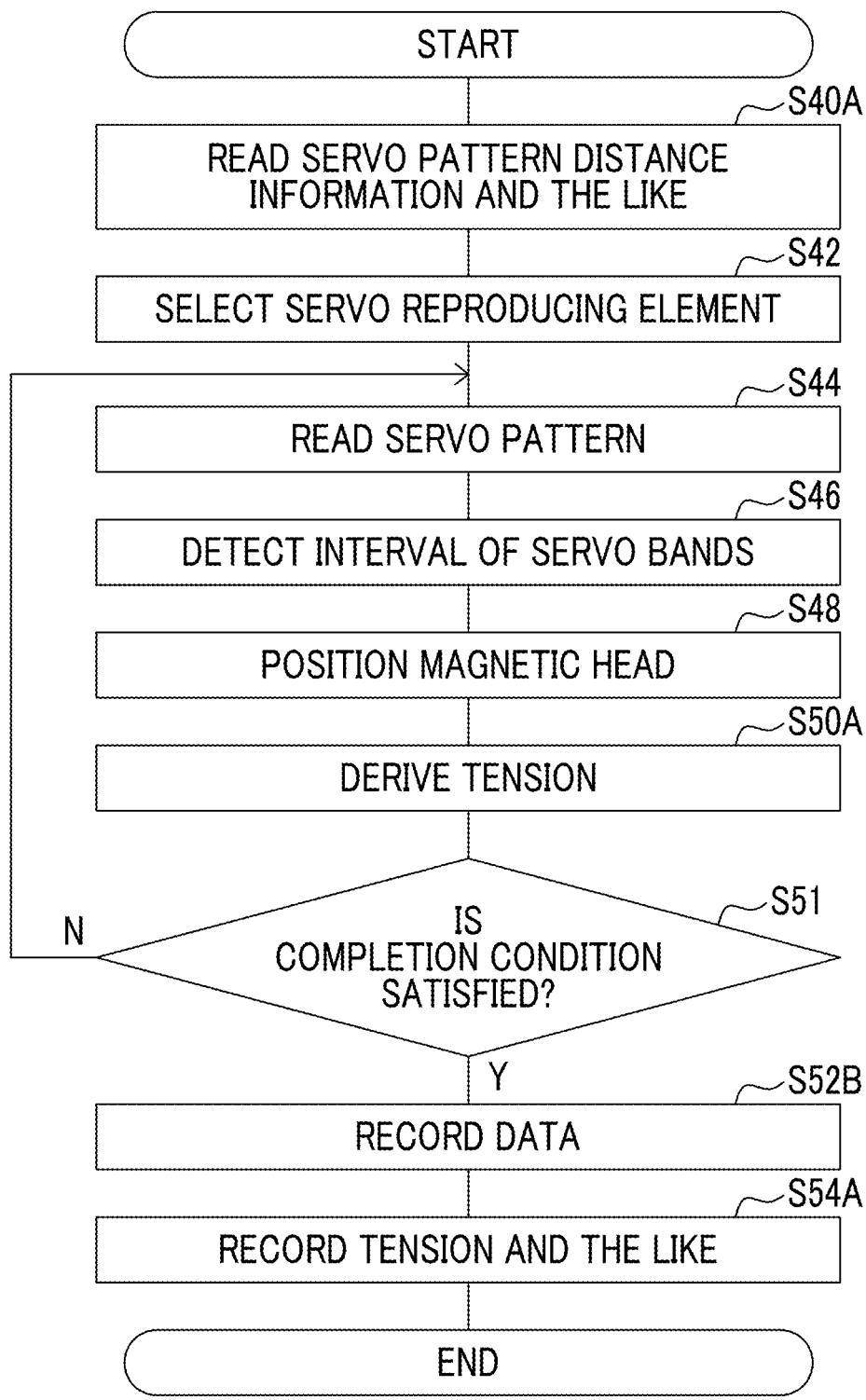
FIG. 28 is a flowchart showing an example of the data recording process according to the fifth embodiment.

Next, a flow of a data recording process of recording data on the magnetic tape cartridge 10 performed by the recording and reproducing system 30 will be described with reference to FIG. 28. The data recording process shown in FIG. 28 is, for example, performed in a case where data which is a recording target is input to the controller 46 of the tape drive 44 from the computer for controlling the tape drive 44. Here, the data recording process is performed in a state where the magnetic tape cartridge 10 is loaded in the tape drive 44. In addition, the same number of steps are used for the steps in FIG. 28 that execute the same processing as in FIG. 22 and description thereof will be omitted. In addition, in the following description, for ease of understanding of the description, the interval Si represented by the reproducing element interval information 47 stored in the tape drive 44 used during the recording of data is referred to as an "interval S1$r$", and the interval S1 represented by the reproducing element interval information 47 stored in the tape drive 44 used during the reproducing of data is referred to as an "interval S1$p$". The tape drive 44 used during the recording of data and the tape drive 44 used during the reproduction may be the same or different.

In Step S40A of FIG. 28, the controller 46 controls the reading and writing unit 48 and causes the reading of the servo pattern distance information 14 and the servo band interval information 16 recorded on the RFID tag 12. Then, the controller 46 obtains the servo pattern distance information 14 and the servo band interval information 16 read by the reading and writing unit 48. The process of Step S40A may be executed immediately after the magnetic tape cartridge 10 is loaded in the tape drive 44. In addition, in a case where the servo pattern distance information 14 has been read before the data recording process shown in FIG. 28 is executed, the servo pattern distance information 14 may be reused.

In Step S50A, the controller 46 derives a tension of the magnetic tape MT based on the interval K3 and the interval K1, according to Expression (8). Tension$_{write}$ in Expression (8) represents a tension of the magnetic tape MT to be derived. SBP$_{ref}$ in Expression (8) represents the interval K3 corresponding to the wrap position and the data band DB, of the servo band interval information 16 obtained by the process of Step S40A, which is positioned by the process of Step S48. SBP$_{write}$ in Expression (8) represents the interval K1 detected by the process of Step S46. α in Expression (8) represents a modulus of deformation of the magnetic tape MT. Tension$_{ref}$ in Expression (8) represents a tension of the magnetic tape MT in a case where the servo writer SW records the servo pattern SP on the servo band SB.

$$\text{Tension}_{write} = \frac{SBP_{write} - SBP_{ref}}{\alpha} + \text{Tension}_{ref} \tag{8}$$

In a case of recording the data, a deviation amount $\Delta P_{write}$ from an ideal value of the interval K1 of the servo band SB detected by the process of Step S46 is obtained by Expression (9). In the embodiment, as shown in Expression (8), the tension of the magnetic tape MT in a case of recording the data on the data band DB is derived in accordance with a difference between the interval K3 of the gap pattern G of the servo writer SW and the interval K1 of the servo band SB. Accordingly, the deviation amount $\Delta P_{write}$ can be set as a suitable value. $h_1$ in Expression (9) is the interval S1$r$ described above.

$$\Delta P_{write} = SBP_{write} - h_1 - \alpha \times \text{Tension}_{write} \tag{9}$$

For example, the modulus of deformation of the magnetic tape MT in Expressions (8) and (9) is derived as a deformation amount of the magnetic tape MT in the tape width direction with respect to 1[N] per the interval 2.858 [mm] of the adjacent servo bands SB by Expression (10). $\varepsilon_{MD}$ in Expression (10) represents a distortion of the magnetic tape MT in the tape longitudinal direction, σ represents a stress, and $E_{MD}$ represents a Young's modulus of the magnetic tape MT in the tape longitudinal direction. α in Expression (10) represents a Poisson's ratio and d represents a unit distance (in the embodiment, 2.858 [mm]). The stress is obtained by using a cross-sectional area obtained from a total thickness and width of the magnetic tape MT. The Young's modulus of the magnetic tape MT in the tape longitudinal direction and the tape total thickness vary depending on a material of the magnetic tape MT such as polyaramide (PA), polyethylene terephthalate (PET), and polyethylene naphthalate (PEN), and are determined according to the material thereof.

$$\varepsilon_{MD} = \frac{\sigma}{E_{MD}}, \alpha = v \times \varepsilon_{MD} \times d \qquad (10)$$

In Step S51, the controller 46 determines whether or not the predetermined completion condition is satisfied. In a case where the determination is denied, the process returns to Step S44, and in a case where the determination is affirmative, the process moves to Step S52B. As the completion condition in this case, for example, the condition in which the tension derived by the process of Step S50A is converged is used. In addition, as the completion condition in this case, for example, the condition in which all servo patterns SP recorded on the servo band SB are read, and the condition in which the predetermined number of servo patterns SP are read are used.

In Step S52B, the controller 46 controls the magnetic head H and records data on the data band DB. In this case, the controller 46 controls a transportation mechanism of pulling the magnetic tape MT so that the tension of the magnetic tape MT becomes a tension derived by the process of the step S50A. In Step S54A, the controller 46 controls the reading and writing unit 48 and records the servo band interval information 16, to which the tension derived by the process of the step S50A, and the interval K1 and the interval S1r detected by the process of the step S46 are added, on the RFID tag 12. In this case, the controller 46 adds the tension, the interval K1, and the interval S1r to the servo band interval information 16 by associating with the number of the data band DB on which the data is recorded and the wrap position. In a case where the process of the step S54A ends, the magnetic tape cartridge 10 is unloaded from the tape drive 44. In a case where the process of Step S54A ends, the data recording process ends. After the process of Step S54A is completed, the next operation may be waited without unloading the magnetic tape cartridge 10 from the tape drive 44.

By the process of the step S54A, as an example shown in FIG. 29, the tension of the magnetic tape MT during the data recording, the interval K1 detected during the data recording, and the interval S1r of the servo reproducing element SRD of the tape drive 44 on which the data is added, to the servo band interval information 16.

Figure 30:
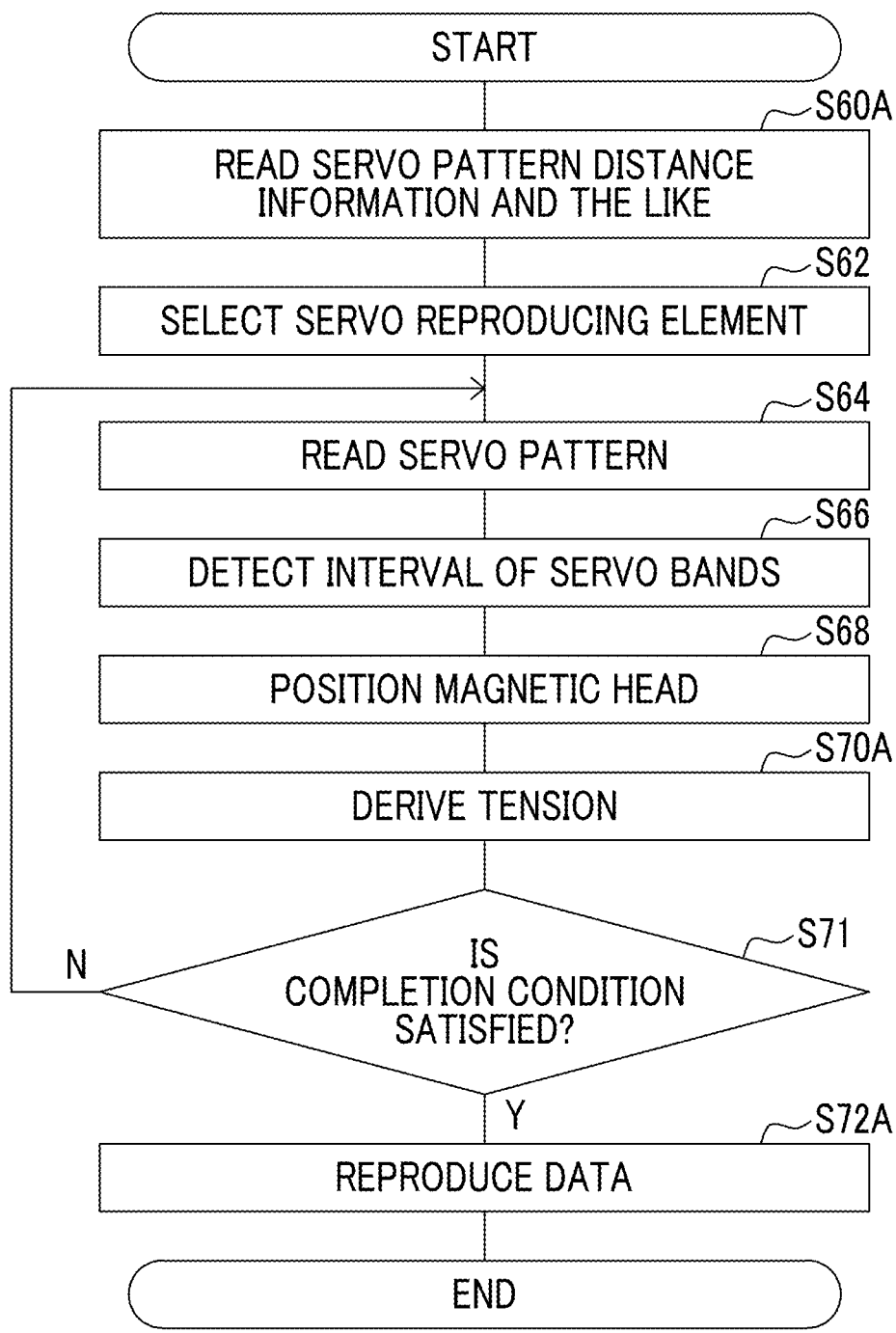
FIG. 30 is a flowchart showing an example of the data reproducing process according to the fifth embodiment.

Next, a flow of the data reproducing process in which the recording and reproducing system 30 reproduces the data recorded on the magnetic tape cartridge 10 will be described with reference to FIG. 30. The data reproducing process shown in FIG. 30 is, for example, performed in a case where a command for reproducing data is input to the controller 46 of the tape drive 44 from the computer for controlling the tape drive 44. Here, the data reproducing process is performed in a state where the magnetic tape cartridge 10 is loaded on the tape drive 44. In addition, the same number of steps are used for the steps in FIG. 30 that execute the same processing as in FIG. 23 and description thereof will be omitted.

In Step S60A of FIG. 30, the controller 46 controls the reading and writing unit 48 and causes the reading of the servo pattern distance information 14 and the servo band interval information 16 recorded on the RFID tag 12. Then, the controller 46 obtains the servo pattern distance information 14 and the servo band interval information 16 read by the reading and writing unit 48. The process of Step S60A may be executed immediately after the magnetic tape cartridge 10 is loaded in the tape drive 44. In addition, in a case where the servo pattern distance information 14 has been read before the data reproducing process shown in FIG. 30 is executed, the servo pattern distance information 14 may be reused.

In Step S70A, the controller 46 derives the tension of the magnetic tape MT based the tension of the magnetic tape MT during the data recording with the interval K1 and the interval S1r included in the servo band interval information 16, and the interval S1p represented by the reproducing element interval information 47, and the interval K1 detected in the process of Step S66. A deviation amount $\Delta P_{read}$ from the ideal value of the interval K1 detected by the process of Step S66 is represented by Expression (11).

$$\Delta P_{read} = SBP_{read} - h_2 - \alpha \times \text{Tension}_{read} \qquad (11)$$

By minimizing a difference between the deviation amount $\Delta P_{write}$ during the data recording and the deviation amount $\Delta P_{read}$ during the data reproducing (in the embodiment, equalizing the deviation amount $\Delta P_{write}$ during the data recording and the deviation amount $\Delta P_{read}$ during the data reproducing), data of the suitable data track DT is reproduced by the recording and reproducing element RWD. Therefore, in the embodiment, the controller 46 derives the tension of the magnetic tape MT based on Expression (12) obtained from Expressions (9) and (11). $\text{Tension}_{read}$ in Expression (12) represents the tension of the magnetic tape MT to be derived. $\text{Tension}_{write}$ in Expression (12) represents the tension of the magnetic tape MT during the data recording included in the servo band interval information 16. $SBP_{write}$ in Expression (12) represents the interval K1 included in the servo band interval information 16. $SBP_{read}$ in Expression (12) represents the interval K1 detected by the process of Step S66. $h_1$ in Expression (12) represents the interval S1r included in the servo band interval information 16 and $h_2$ represents the interval S1p represented by the reproducing element interval information 47. a in Expression (12) represents a modulus of deformation of the magnetic tape MT described above.

$$\text{Tension}_{read} = \frac{SBP_{write} - SBP_{read}}{\alpha} - \frac{h_1 - h_2}{\alpha} + \text{Tension}_{write} \qquad (12)$$

In Step S71, the controller 46 determines whether or not the predetermined completion condition is satisfied, in the same manner as in Step S51. In a case where the determination is denied, the process returns to Step S64, and in a case where the determination is affirmative, the process moves to Step S72A.

In the step S72A, the controller 46 controls the magnetic head H and reproduces the data recorded on the data band DB. In this case, the controller 46 controls a transportation mechanism of pulling the magnetic tape MT so that the tension of the magnetic tape MT becomes a tension derived by the process of the step S70A. In a case where the process of the step S72A ends, the magnetic tape cartridge 10 is unloaded from the tape drive 44. In a case where the process of the step S72A ends, this data reproducing process ends. After the process of Step S72A is completed, the next operation may be waited without unloading the magnetic tape cartridge 10 from the tape drive 44.

As described above, according to the embodiment, in a case of reproducing the data, the control of setting the tension of the magnetic tape MT as the tension which minimizes a difference between the deviation amount $\Delta P_{write}$ during the data recording and the deviation amount $\Delta P_{read}$ during the data reproducing is performed. Therefore, even in a case where the magnetic tape MT is deformed in the tape width direction due to time elapse, heat, and the like, it is possible to perform the positioning of the magnetic head H with an excellent accuracy.

Figure 31:
FIG. 31 is a view showing an example of an ideal servo pattern and an actual servo pattern.
Figure 31:
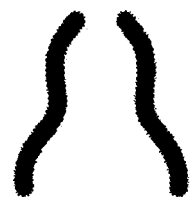
Figure 31:
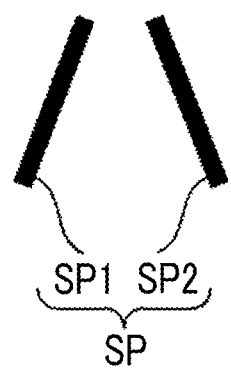
Figure 31:
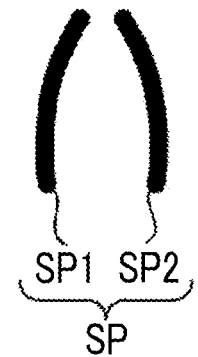

In addition, as an example shown in FIG. 31, it is ideal for the servo patterns SP to be linearly recorded, but in practice, the servo patterns SP are recorded in a curved manner, in many cases. In contrast, in each of the above embodiments, the magnetic head H is positioned by using the servo pattern distance information 14 obtained by measuring the gap pattern G in which the servo pattern SP is actually formed on the magnetic tape MT, in consideration of that the servo pattern SP is curved. Accordingly, it is possible to perform the positioning of the magnetic head H with an excellent accuracy.

In the first to fifth embodiments, it has been described that the data band DB is divided into the upper and lower regions, and the two servo reproducing element SRD are selected according to which of the two regions the target track is positioned in, but there is no limitation thereto. For example, the data band DB may be divided into three or more regions, and the two servo reproducing element SRD may be selected according to which of the divided regions the target track is positioned in.

Figure 32:
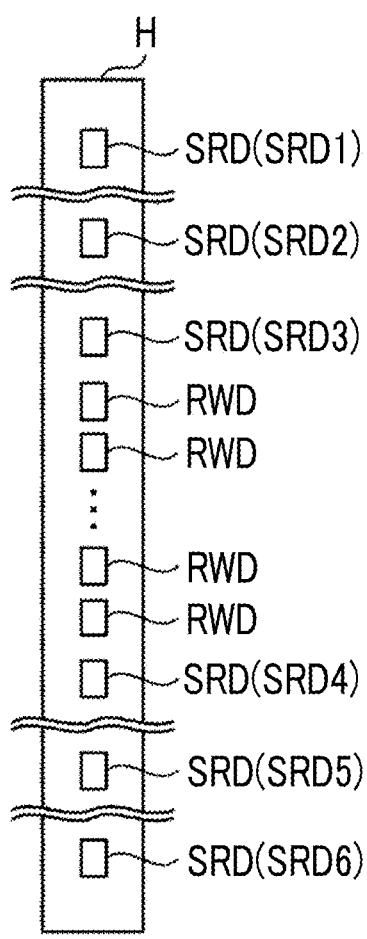
FIG. 32 is a view showing an example of a configuration of a magnetic head according to a modification example.

Specifically, for example, in a case where the data band DB is divided into three regions, the magnetic head H comprises a plurality of recording and reproducing elements RWD and six servo reproducing elements SRD as shown in FIG. 32 as an example. In the following description, in a case of distinguishing the six servo reproducing elements SRD, the numbers are added in order from the top to the end of the reference numerals, as a servo reproducing element SRD1 to a servo reproducing element SRD6.

In this embodiment, the recording and reproducing element RWD is arranged along the tape width direction between a servo reproducing element SRD3 and a servo reproducing element SRD4. In addition, the number of recording and reproducing elements RWD is smaller than the number of data track groups included in one data band DB. Specifically, the number of recording and reproducing elements RWD is ⅓ of the number of data track groups included in one data band DB. The number of the servo reproducing elements SRD in this embodiment is six which is twice the ratio of the number of the data track groups included in one data band DB to the number of the recording and reproducing elements RWD. In addition, the recording and reproducing elements RWD are arranged at intervals corresponding to the data track groups continuous in the tape width direction.

Figure 33:
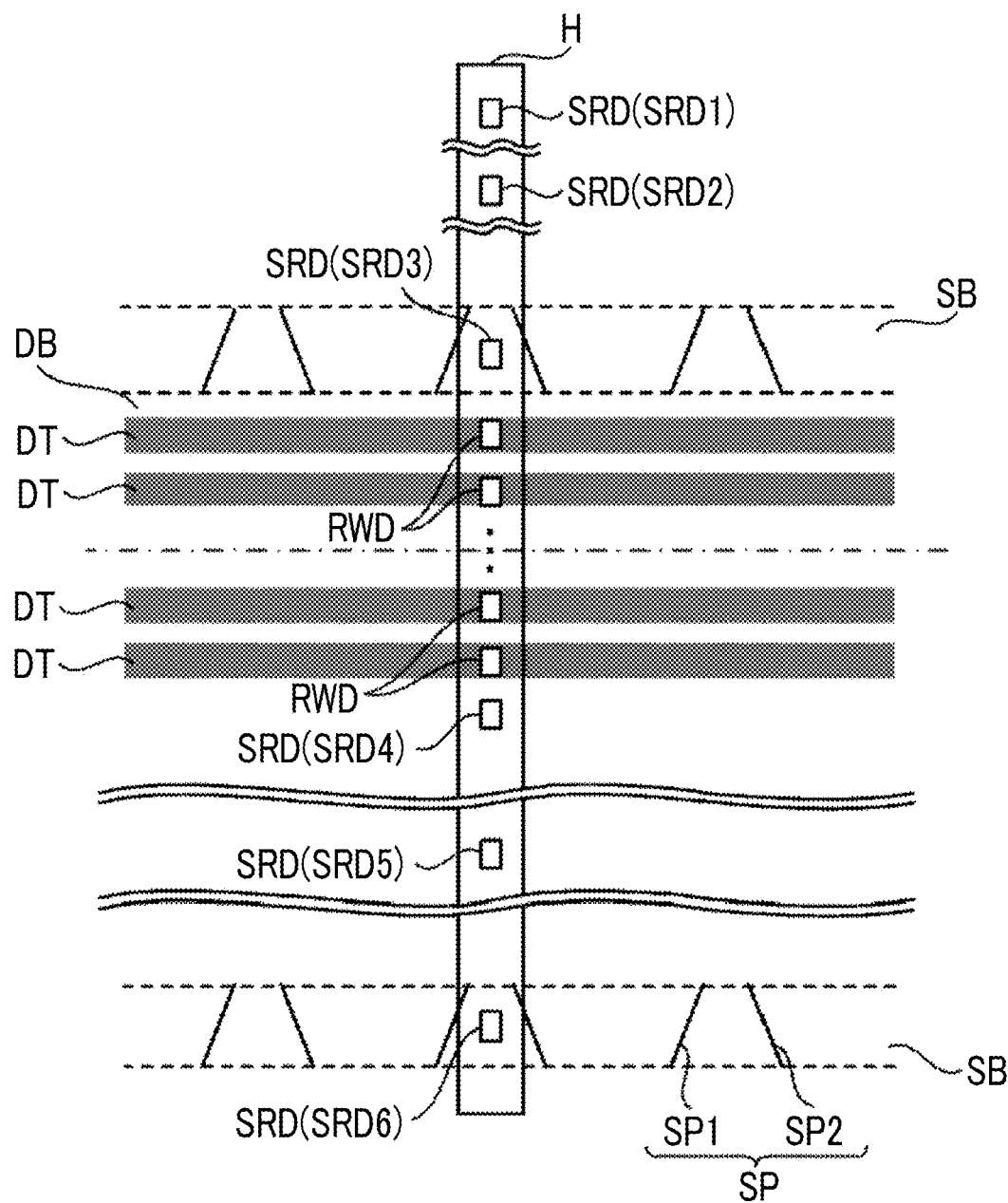
FIG. 33 is a view for describing the selection process of the servo reproducing element.
Figure 34:
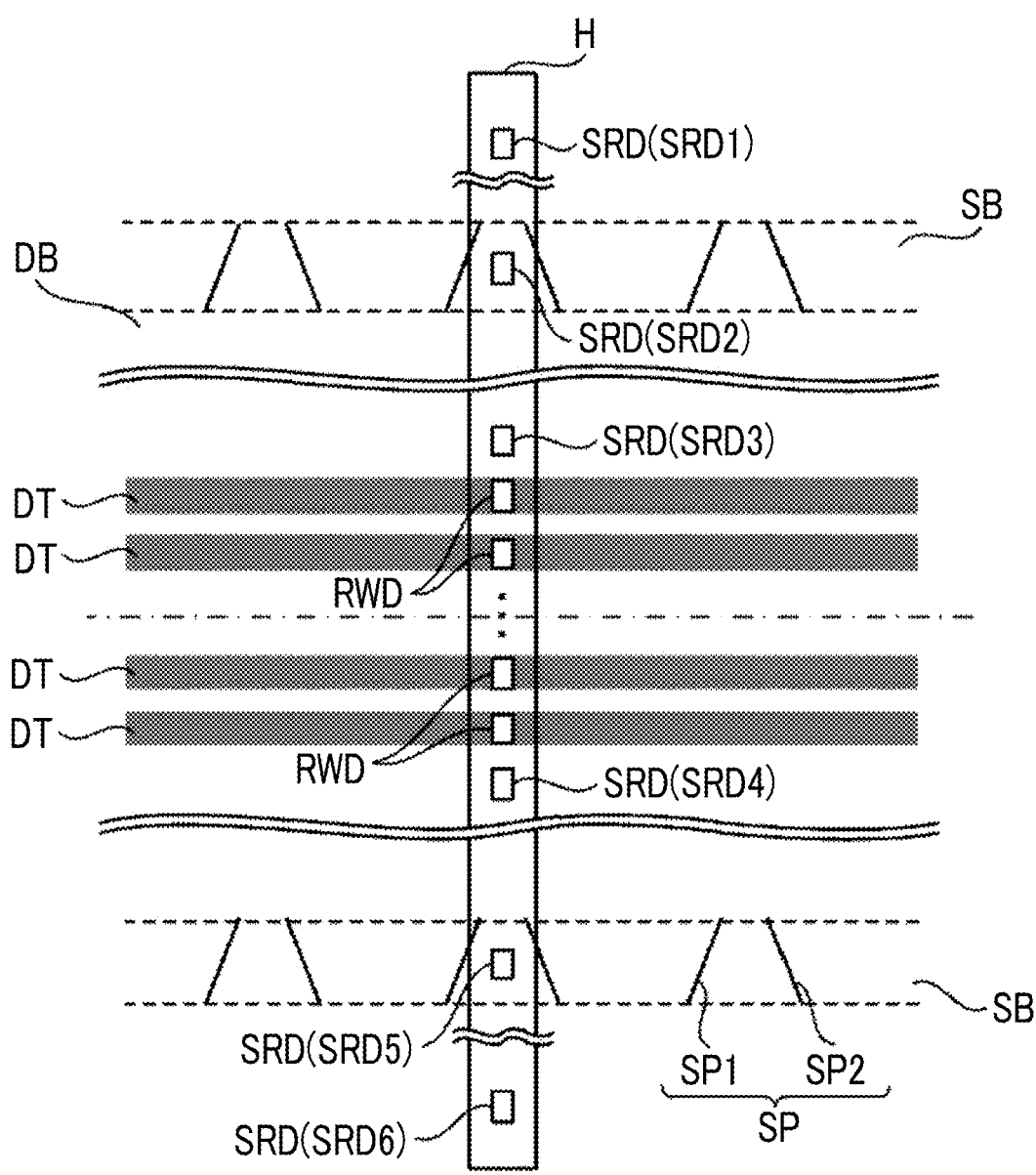
FIG. 34 is a view for describing the selection process of the servo reproducing element.
Figure 35:
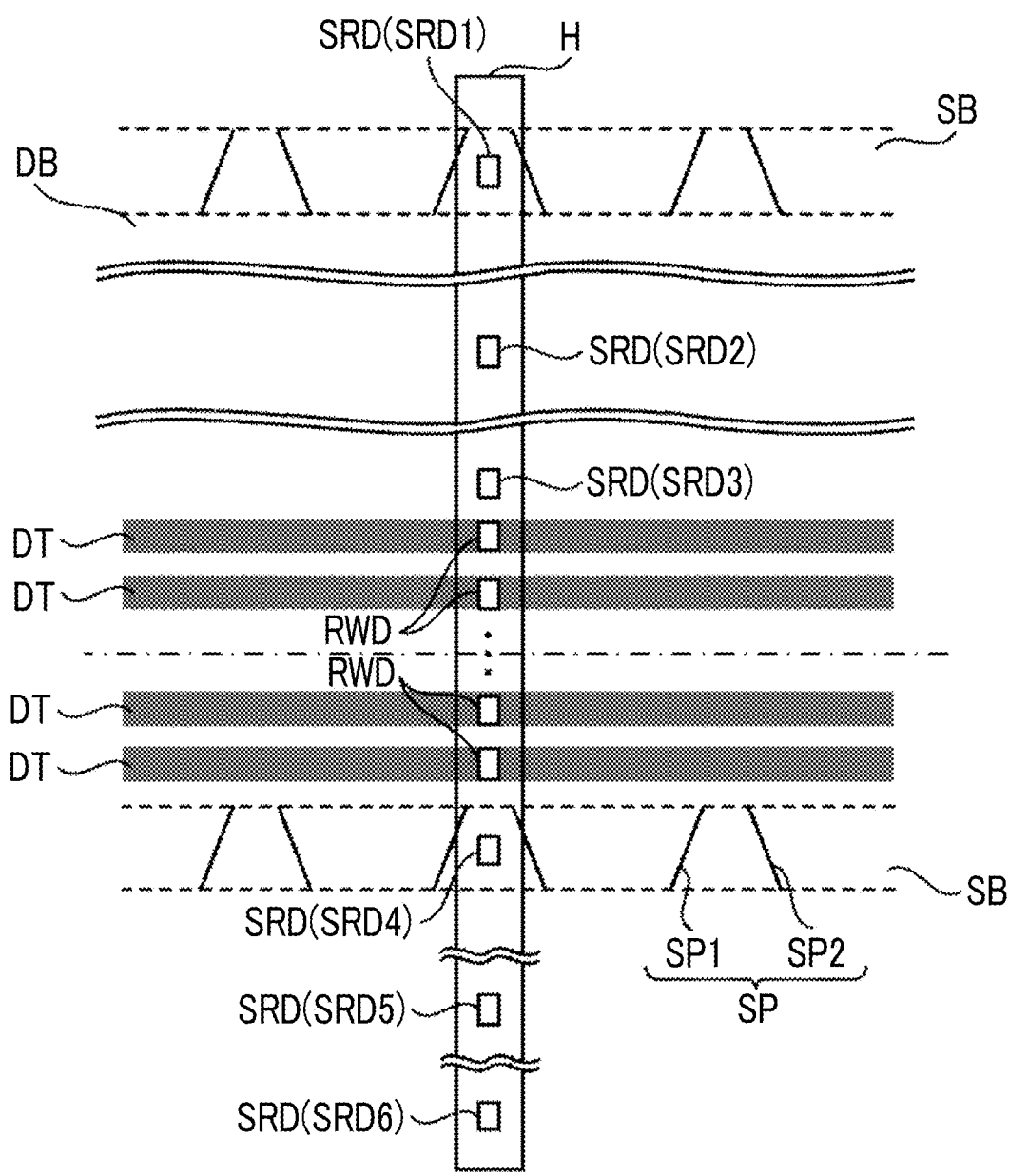
FIG. 35 is a view for describing the selection process of the servo reproducing element.

The tape drive 44 according to this embodiment selects two servo reproducing elements SRD from the six servo reproducing elements SRD of the magnetic head H according to the position of the target track along the tape width direction. Specifically, as shown in FIG. 33, the tape drive 44 selects the servo reproducing element SRD3 and the servo reproducing element SRD6, in a case where the target track is positioned in the upper region of the data band DB. In addition, as shown in FIG. 34, the tape drive 44 selects the servo reproducing element SRD2 and the servo reproducing element SRD5, in a case where the target track is positioned in the center region of the data band DB. Further, as shown in FIG. 35, the tape drive 44 selects the servo reproducing element SRD1 and the servo reproducing element SRD4, in a case where the target track is positioned in the lower region of the data band DB.

As described above, in a case where the ratio of the number of the data tracks included in one data band DB to the number of the recording and reproducing elements RWD simultaneously used during the recording or reproducing operation is 3, the number of servo reproducing elements SRD is 6 (=2×3). In addition, as in the second embodiment, in a case where the ratio of the number of the data tracks included in one data band DB to the number of the recording and reproducing elements RWD simultaneously used during the recording or reproducing operation is 2, the number of servo reproducing elements SRD is 4 (=2×2). That is, the number of servo reproducing elements SRD may be twice the ratio of the number of the data tracks included in one data band DB to the number of the recording and reproducing elements RWD simultaneously used during the recording or reproducing operation.

In addition, in the fifth embodiment, a case of recording the servo band interval information 16 on the RFID tag 12 has been described, but there is no limitation thereto. For example, the servo band interval information 16 may be repeatedly recorded on a top portion or over the entire length of the data band DB or the servo band SB. In addition, the servo band interval information 16 may be recorded on a barcode recorded at a predetermined position of an outer peripheral surface of the magnetic tape cartridge 10. In addition, the servo band interval information 16 may be recorded on a two-dimensional code such as a QR code (registered trademark) recorded at a predetermined position of an outer peripheral surface of the magnetic tape cartridge 10.

In the fifth embodiment, the servo band interval information 16 may be recorded on a database of the outside. In this case, for example, identification information such as a manufacturing number of the magnetic tape cartridge 10 may be recorded on the RFID tag 12, the barcode, or the two-dimensional code, and the servo band interval information 16 may be recorded on the database by associating with the identification information of the magnetic tape cartridge 10.

In the fifth embodiment, various pieces information included in the servo band interval information 16 may be included in the servo band interval information 16 at each different position of the magnetic tape MT in the tape longitudinal direction.

What is claimed is:

1. A recording and reproducing apparatus comprising:
   a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track, and at least two servo reproducing elements that read servo patterns adjacent to each other in the width direction of the magnetic tape, respectively;
a selection unit that selects one or two servo reproducing elements from the servo reproducing elements of the magnetic head according to a position of the data track, as a target of recording or reproducing of data in the data band, along the width direction; and
a controller that controls positioning of the magnetic head along the width direction by using a result of reading of the servo patterns by the servo reproducing element selected by the selection unit.

2. The recording and reproducing apparatus according to claim 1,
wherein the number of the recording and reproducing elements simultaneously used during a recording or reproducing operation is smaller than the number of the data tracks included in one data band,
the number of the servo reproducing elements is three or more according to a ratio of the number of the data tracks included in one data band to the number of the recording and reproducing elements, and
the selection unit selects two servo reproducing elements according to the position.

3. The recording and reproducing apparatus according to claim 2,
wherein one data band comprises a plurality of data track groups each including the plurality of the data tracks, and
the number of the recording and reproducing elements simultaneously used during the recording or reproducing operation is smaller than the number of the data track groups included in one data band.

4. The recording and reproducing apparatus according to claim 3,
wherein the number of the servo reproducing elements is twice a ratio of the number of the data track groups included in one data band to the number of the recording and reproducing elements simultaneously used during the recording or reproducing operation.

5. The recording and reproducing apparatus according to claim 2,
wherein the controller controls positioning of the magnetic head along the width direction so that a ratio between deviation amounts of the two servo reproducing elements selected by the selection unit from a target position becomes a ratio between distances from a center between the recording and reproducing elements on both ends of the magnetic head along the width direction to the two selected servo reproducing elements.

6. A recording and reproducing method performed by a recording and reproducing apparatus including a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track and at least two servo reproducing elements that read servo patterns adjacent to each other in the width direction of the magnetic tape, respectively, the method comprising:
selecting one or two servo reproducing elements from the servo reproducing elements of the magnetic head according to a position of the data track, as a target of recording or reproducing of data in the data band, along the width direction; and
positioning the magnetic head along the width direction by using a result of reading of the servo patterns by the selected one or two servo reproducing elements.

7. The recording and reproducing method according to claim 6,
wherein the number of the recording and reproducing elements simultaneously used during a recording or reproducing operation is smaller than the number of the data tracks included in one data band,
the number of the servo reproducing elements is three or more according to a ratio of the number of the data tracks included in one data band to the number of the recording and reproducing elements, and
two servo reproducing elements are selected according to the position, and
the method further comprising positioning the magnetic head along the width direction such that a ratio between deviation amounts of the two selected servo reproducing elements from a target position becomes a ratio between distances from a center between the recording and reproducing elements on both ends of the magnetic head along the width direction to the two selected servo reproducing elements.

8. A non-transitory storage medium storing a program that causes a recording and reproducing apparatus to perform recording and reproducing processing, the recording and reproducing apparatus including a magnetic head that is used for a magnetic tape, in which a servo band on which a servo pattern is recorded and a data band having a plurality of data tracks on which data is recorded are alternately arranged along a width direction, the magnetic head including a recording and reproducing element that records or reproduces data with respect to the data track and at least two servo reproducing elements that read servo patterns adjacent to each other in the width direction of the magnetic tape, respectively, the recording and reproducing processing comprising:
selecting one or two servo reproducing elements from the servo reproducing elements of the magnetic head according to a position of the data track, as a target of recording or reproducing of data in the data band, along the width direction; and
positioning the magnetic head along the width direction by using a result of reading of the servo patterns by the selected servo reproducing elements.

9. The non-transitory storage medium according to claim 8,
wherein the number of the recording and reproducing elements simultaneously used during a recording or reproducing operation is smaller than the number of the data tracks included in one data band,
the number of the servo reproducing elements is three or more according to a ratio of the number of the data tracks included in one data band to the number of the recording and reproducing elements, and
two servo reproducing elements are selected according to the position, and
the recording and reproducing processing comprising further comprising positioning the magnetic head along the width direction such that a ratio between deviation amounts of the two selected servo reproducing elements from a target position becomes a ratio between distances from a center between the recording and reproducing elements on both ends of the magnetic head along the width direction to the two selected servo reproducing elements.

* * * * *